United States Patent
Lyu et al.

(10) Patent No.: US 12,267,856 B2
(45) Date of Patent: Apr. 1, 2025

(54) METHOD FOR COMMUNICATION AND TERMINAL DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/645,321

(22) Filed: Apr. 24, 2024

(65) Prior Publication Data

US 2024/0373446 A1 Nov. 7, 2024

Related U.S. Application Data

(63) Continuation of application No. PCT/CN2023/100702, filed on Jun. 16, 2023.

(30) Foreign Application Priority Data

May 6, 2023 (CN) ......... 202310500291.X

(51) Int. Cl.
*H04W 72/40* (2023.01)
*H04B 17/318* (2015.01)
(Continued)

(52) U.S. Cl.
CPC .......... *H04W 72/40* (2023.01); *H04B 17/328* (2023.05); *H04W 28/26* (2013.01);
(Continued)

(58) Field of Classification Search
CPC . H04W 72/40; H04W 72/542; H04W 72/563; H04W 28/26; H04W 72/0446; H04B 17/328
See application file for complete search history.

(56) References Cited

U.S. PATENT DOCUMENTS

| 2019/0274121 A1 | 9/2019 | Wu et al. | |
| 2022/0256525 A1* | 8/2022 | Lin | H04W 88/06 |

(Continued)

FOREIGN PATENT DOCUMENTS

| CN | 110268780 | 9/2019 |
| CN | 114788369 | 7/2022 |

(Continued)

OTHER PUBLICATIONS

3GPP TS 23.285 V17.1.0, "3rd Generation Partnership Project; Technical Specification Group Services and System Aspects; Architecture enhancements for V2X services (Release 17)," Jun. 2022, 38 pages.

(Continued)

*Primary Examiner* — Rhonda L Murphy
(74) *Attorney, Agent, or Firm* — Fish & Richardson P.C.

(57) ABSTRACT

The present application provides a method for communication and a terminal device. An example method includes: performing resource allocation for a first resource set based on first information, wherein the first resource set is shared by the first radio access technology (RAT) sidelink (SL) and the second RAT SL, and the first information is associated with a resource of the first RAT SL.

18 Claims, 3 Drawing Sheets

A terminal device performs resource allocation for a first resource set based on first information — S310

(51) Int. Cl.
  *H04W 28/26* (2009.01)
  *H04W 72/0446* (2023.01)
  *H04W 72/542* (2023.01)
  *H04W 72/563* (2023.01)

(52) U.S. Cl.
  CPC ..... *H04W 72/0446* (2013.01); *H04W 72/542* (2023.01); *H04W 72/563* (2023.01)

(56) References Cited

U.S. PATENT DOCUMENTS

2023/0292344 A1* 9/2023 Hwang ................ H04L 1/00
2024/0349312 A1* 10/2024 Dutta ................... H04W 28/26

FOREIGN PATENT DOCUMENTS

| CN | 115024004 | 9/2022 |
| CN | 115516972 | 12/2022 |
| CN | 116113043 | 5/2023 |
| WO | WO 2020118724 | 6/2020 |
| WO | WO 2022055191 | 3/2022 |

OTHER PUBLICATIONS

3GPP TS 36.213 V17.5.0, "3rd Generation Partnership Project; Technical Specification Group Radio Access Network; Evolved Universal Terrestrial Radio Access (E-UTRA); Physical layer procedures (Release 17)," Mar. 2023, 584 pages.

3GPP TS 38.214 V17.5.0, "3rd Generation Partnership Project; Technical Specification Group Radio Access Network; NR; Physical layer procedures for data (Release 17)," Mar. 2023, 231 pages.

International Search Report and Written Opinion in International Appln. No. PCT/CN2023/100702, mailed on Dec. 12, 2023, 18 pages (with English machine translation).

Notice of Allowances in Chinese Appln. No. 202310500291.X, mailed on Jul. 12, 2023, 3 pages (with English translation).

Office Action in Chinese Appln. No. 202310500291.X, mailed on Jun. 27, 2023, 22 pages (with English translation).

* cited by examiner

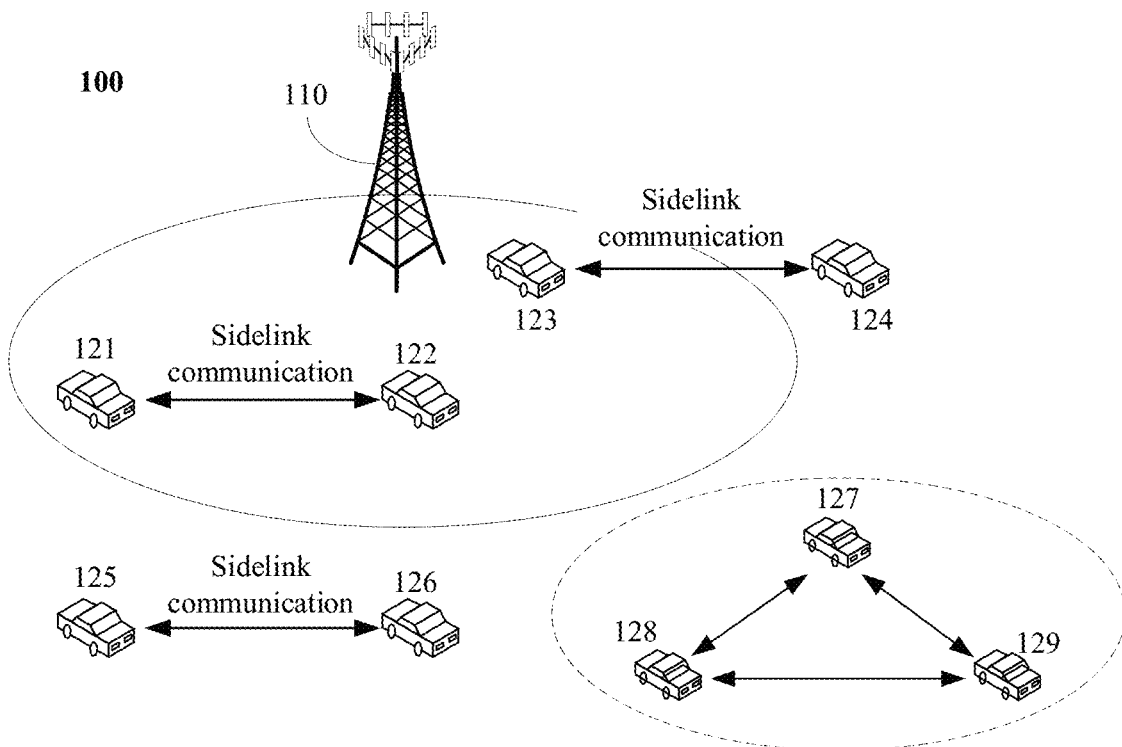
FIG. 1
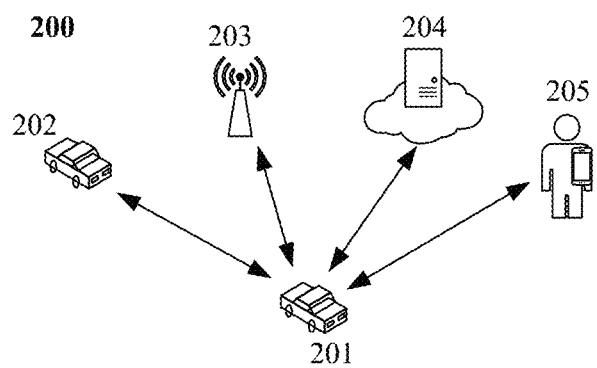
FIG. 2
| A terminal device performs resource allocation for a first resource set based on first information | — S310 |
FIG. 3

METHOD FOR COMMUNICATION AND TERMINAL DEVICE

CROSS-REFERENCE TO RELATED APPLICATIONS

This application continuation of International Application No. PCT/CN2023/100702, filed on Jun. 16, 2023, which claims priority to Chinese Patent Application No. 202310500291.X, filed with the Chinese Patent Office on May 6, 2023 and entitled "METHOD FOR COMMUNICATION AND TERMINAL DEVICE", which is incorporated herein by reference in its entirety.

TECHNICAL FIELD

The present application relates to the field of communications technologies, and more specifically, to a method for communication and a terminal device.

BACKGROUND

In some scenarios, different radio access technologies (RATs) based on a sidelink (SL) may need to coexist in a co-channel scenario, so as to achieve a higher data rate and meet requirements of different service scenarios. For example, different RATs in a same terminal device may need to coexist in the co-channel scenario. In a case of a terminal device including a plurality of RATs based on an SL, interference may occur between the plurality of RATs.

SUMMARY

The present application provides a method for communication and a terminal device. Various aspects used in the present application are described below.

According to a first aspect, a communication method is provided. The method is applied to a terminal device, the terminal device includes a first RAT SL module and a second RAT SL module, and the method includes: performing, by the terminal device, resource allocation for a first resource set based on first information, where the first resource set is shared by the first RAT SL module and the second RAT SL module, and the first information is associated with a resource of the first RAT SL module.

According to a second aspect, a terminal device is provided. The terminal device includes a first RAT SL module and a second RAT SL module, and the terminal device includes: a resource allocation module, configured to perform resource allocation for a first resource set based on first information, where the first resource set is shared by the first RAT SL module and the second RAT SL module, and the first information is associated with a resource of the first RAT SL module.

According to a third aspect, a terminal device is provided, and includes a processor and a memory. The memory is configured to store one or more computer programs, and the processor is configured to invoke a computer program in the memory to cause the terminal device to perform some or all of the steps in the method according to the first aspect.

According to a fourth aspect, an embodiment of the present application provides a communications system, and the system includes the terminal device described above. In another possible design, the system may further include another device interacting with the terminal device in the solution provided in embodiments of the present application.

According to a fifth aspect, an embodiment of the present application provides a computer-readable storage medium. The computer-readable storage medium stores a computer program, and the computer program causes a terminal device to perform some or all of the steps in the method according to the first aspect.

According to a sixth aspect, an embodiment of the present application provides a computer program product. The computer program product includes a non-transitory computer-readable storage medium storing a computer program, and the computer program is operable to cause a terminal device to perform some or all of the steps of the method according to the first aspect. In some implementations, the computer program product may be a software installation package.

According to a seventh aspect, an embodiment of the present application provides a chip. The chip includes a memory and a processor, and the processor may invoke and run a computer program from the memory, to implement some or all of the steps of the method according to the first aspect.

In embodiments of the present application, a terminal device can perform, based on first information, resource allocation for resources (a first resource set) shared by a first RAT SL module and a second RAT SL module, thereby helping avoid a transmission conflict between the first RAT SL module and the second RAT SL module.

BRIEF DESCRIPTION OF THE DRAWINGS

FIG. 1 is an example diagram of a system architecture of a wireless communications system to which an embodiment of the present application is applicable.

FIG. 2 is an example diagram of a V2X communications system.

FIG. 3 is a schematic flowchart of a method for communication according to an embodiment of the present application.

DETAILED DESCRIPTION OF THE EMBODIMENTS

Figure 4:
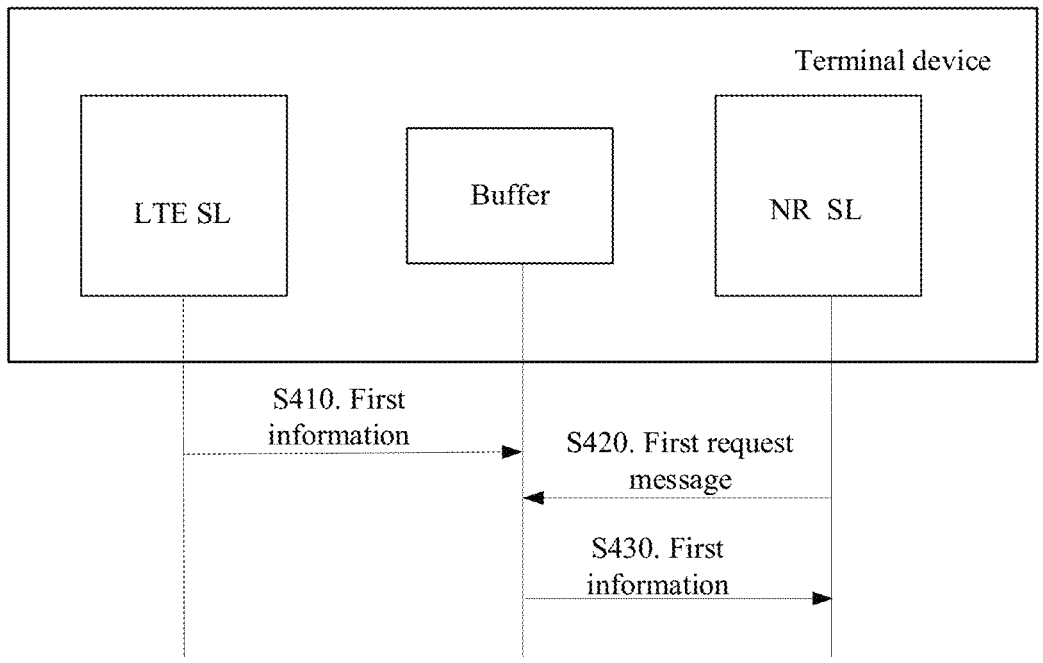
FIG. 4 is an implementation of sharing first information by a first RAT SL module and a second RAT SL module.

The following clearly and completely describes the technical solutions in the embodiments of the present application with reference to the accompanying drawings. Apparently, the described embodiments are only some rather than all of the embodiments of the present application. For ease of understanding, the terms and communication processes involved in the present application are first described below.

Communications System Architecture

FIG. 1 is an example diagram of a system architecture of a wireless communications system 100 to which the embodiments of the present application are applicable. The wireless communications system 100 may include a network device 110 and terminal devices 121 to 129. The network device 110 may provide communication coverage for a specific geographic area, and may communicate with a terminal device located within the coverage.

In some implementations, terminal devices may communicate with each other through a sidelink (SL). The sidelink communication may also be referred to as proximity services (ProSe) communication, unilateral communication, side link communication, device-to-device (D2D) communication, or the like.

In other words, sidelink data may be transmitted between terminal devices over sidelink. The sidelink data may include data and/or control signaling. In some implementations, the sidelink data may be, for example, a physical sidelink control channel (PSCCH), a physical sidelink shared channel (PSSCH), a PSCCH demodulation reference signal (DMRS), a PSSCH DMRS, or a physical sidelink feedback channel (PSFCH).

Several common sidelink communication scenarios are described below with reference to FIG. 1. Sidelink communication may include three scenarios depending on whether the terminal devices in the sidelink are within the coverage of the network device. In scenario 1, the terminal devices perform sidelink communication within the coverage of the network device. In scenario 2, among terminal devices that perform sidelink communication, some terminal devices are within the coverage of the network device, and some terminal devices are out of the coverage of the network device. In scenario 3, the terminal devices perform sidelink communication outside the coverage of the network device.

As shown in FIG. 1, in scenario 1, terminal devices 121 and 122 may communicate with each other over a sidelink, and the terminal devices 121 and 122 are both within the coverage of the network device 110, or in other words, the terminal devices 121 and 122 are both within the coverage of the same network device 110. In this scenario, the network device 110 may send configuration signaling to the terminal devices 121 and 122, and accordingly, the terminal devices 121 and 122 communicate with each other over the sidelink based on the configuration signaling.

As shown in FIG. 1, in scenario 2, terminal devices 123 and 124 may communicate with each other over a sidelink, and the terminal device 123 is within the coverage of the network device 110, while the terminal device 124 is outside the coverage of the network device 110. In this scenario, the terminal device 123 receives configuration information from the network device 110, and communicates over the sidelink based on a configuration of the configuration signaling. However, for the terminal device 124, since the terminal device 124 is outside the coverage of the network device 110, the terminal device 124 cannot receive the configuration information from the network device 110. In this case, the terminal device 124 may obtain a configuration of the sidelink communication based on pre-configured configuration information and/or the configuration information sent by the terminal device 123 within the coverage, so as to communicate with the terminal device 123 over the sidelink based on the obtained configuration.

In some cases, the terminal device 123 may send the configuration information to the terminal device 124 through a physical sidelink broadcast channel (PSBCH), so as to configure the terminal device 124 to communicate over the sidelink.

As shown in FIG. 1, in scenario 3, terminal devices 125 to 129 are all outside the coverage of the network device 110 and cannot communicate with the network device 110. In this case, all the terminal devices may perform sidelink communication based on preconfigured configuration information.

In some cases, the terminal devices 127 to 129 outside the coverage of the network device may form a communication cluster, and the terminal devices 127 to 129 in the communication cluster may communicate with each other. In addition, the terminal device 127 in the communication cluster may serve as a central control node, also referred to as a cluster header (CH). Correspondingly, the other terminal devices in the communication cluster may be referred to as "cluster members".

The terminal device 127 as the CH may have one or more of the following functions: responsible for establishment of the communication cluster; joining and leaving of the cluster members; resource coordination, allocation of sidelink transmission resources for the cluster members, and reception of sidelink feedback information from the cluster members; resource coordination with another communication cluster; and other functions.

It should be noted that FIG. 1 exemplarily shows a network device and a plurality of terminal devices. Optionally, the wireless communications system 100 may include a plurality of network devices, and another number of terminal devices may be included in the coverage of each network device, which is not limited in embodiments of the present application.

Optionally, the wireless communications system 100 may further include other network entities such as a network controller and a mobility management entity, which is not limited in the embodiments of the present application.

It should be understood that the technical solutions in the embodiments of the present application may be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The terminal device in the embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a wireless communications device, a user agent, a user apparatus or the like. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the terminal device may be used to act as a base station. For example, the terminal device may act as a scheduling entity, which provides a sidelink signal between terminal devices in vehicle-to-everything (V2X) or D2D, or the like. For example, a cellular phone and a car communicate with each other using sidelink data. A cellular phone and a smart home device communicate with each other, without the relay of a communication signal through a base station.

The network device in the embodiments of the present application may be a device for communicating with the terminal device. The network device may also be referred to as an access network device or a wireless access network device. For example, the network device may be a base station. The network device in the embodiments of the present application may be a radio access network (RAN) node (or device) that connects the terminal device to a wireless network. The base station may broadly cover various names in the following, or may be interchangeable with one of the following names, for example: a NodeB, an evolved NodeB (eNB), a next generation NodeB (gNB), a relay station, a transmitting and receiving point (TRP), a transmitting point (TP), an access point (AP), a master MeNB, a secondary SeNB, a multi-standard radio (MSR) node, a home base station, a network controller, an access node, a radio node, a transmission node, a transceiver node, a base band unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that assumes the function of a base station in D2D, V2X, and machine-to-machine (M2M) communications, a network-side device in a 6G network, a device that assumes the function of a base station in a future communications system, or the like. The base station may support networks of the same or different access technologies. A specific technology and specific device form used by the network device are not limited in the embodiments of the present application.

The base station may be fixed or mobile. For example, a helicopter or an unmanned aerial vehicle may be configured to act as a mobile base station, and one or more cells may move according to the position of the mobile base station. In other examples, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including being indoors or outdoors, handheld, or in-vehicle, may be deployed on a water surface, or may be deployed on a plane, a balloon, or a satellite in the air. In the embodiments of the present application, a scenario where the network device and the terminal device are located is not limited.

It should be understood that all or some of the functions of the communications device in the present application may also be implemented by software functions running on hardware, or by virtualization functions instantiated on a platform (such as a cloud platform).

Communication Mode for Sidelink

With the development of sidelink communications (or side link communications) technologies, the sidelink communications technologies relate to information exchange between various terminal devices. A V2X communications system 200 shown in FIG. 2 is used as an example, in which vehicle-to-vehicle (V2V) communication between a terminal device 201 and a terminal device 202 relates to information exchange between the vehicles themselves. Vehicle-to-infrastructure (V2I) communication, vehicle-to-network (V2N) communication, and vehicle-to-pedestrian (V2P) communication respectively between the terminal device 201 and terminal devices 203 to 205 relate to information exchange between the vehicles and an external system.

The gradual expansion of the information exchange range imposes higher requirements on the communications system. For example, the communications system is required to support higher throughput, lower latency, higher reliability, larger coverage, more flexible resource allocation, and the like. The development of V2X is used as an example. In LTE-V2X, only a broadcast mode is supported between terminal devices for sidelink communication. In NR-V2X, three communication modes, namely, broadcast, groupcast, and unicast, may be supported.

Broadcast is the most basic communication mode in sidewalk communication. For the transmission mode of broadcast, a terminal device that receives sidelink data may be any terminal device around a terminal device used as a transmitting end. For example, still referring to FIG. 1, assuming that the terminal device 125 sends sidelink data in a broadcast mode as a transmitting end, any of the terminal devices 121 to 124 and the terminal devices 126 to 129 around the terminal device 125 may be used as a receiving end of the sidelink data.

Groupcast communication is used to support information exchange between terminal devices in a specific group (or referred to as a communication cluster), so as to assist in the negotiation and decision-making between terminal devices in the group. Sidelink groupcast has two transmission types. Type 1 is for a managed group with a stable connection relationship, which has clear ID information and group member information. Type 2 is for a connectionless group formed in a connectionless manner, for example, is a distance-based dynamically formed groupcast, which requires a communication distance of the current service to be clearly indicated.

For the transmission mode of groupcast, sidelink data may be received by all terminal devices in a communication cluster. Alternatively, the sidelink data may be received by all terminal devices within a specific transmission distance. For example, referring to FIG. 1, for a communication cluster including the terminal devices 127 to 129, when the terminal device 127 sends sidelink data in a groupcast mode, all the other terminal devices 128 and 129 in the communication cluster are terminal devices that receive the sidelink data. For another example, referring to FIG. 1, assuming that terminal devices within a preset range include the terminal devices 127 to 129, when the terminal device 127 sends sidelink data in a groupcast manner, all the other terminal devices 128 and 129 within the preset range are terminal devices that receive the sidelink data.

Unicast communication may enable sidelink communication between two terminal devices. NR-V2X is used as an example, in which radio resource control (RRC) signaling based on a PC5 interface may enable reliable communication between one terminal device and another.

For the transmission mode of unicast, there is usually only one terminal device that receives sidelink data. Referring to FIG. 1, the terminal device 121 and the terminal device 122 may communicate in the transmission mode of unicast. For example, when the terminal device 121 performs sidelink communication with the terminal device 122, the terminal device 122 receives sidelink data as a unique receiving device. The sidelink data may include a PSSCH and a PSCCH. Through demodulation, the terminal device 122 may obtain sidelink control information (SCI) related to sidelink transmission and scheduling. The SCI may help the terminal device 122 to receive and decode sidelink information.

In some communications systems (such as NR-V2X), sidelink unicast and groupcast services support a hybrid automatic repeat request (HARQ) mechanism by means of an acknowledgment (ACK)/a negative acknowledgment (NACK). For groupcast services, NACK-only HARQ may also be used. In addition, a blind retransmission mechanism is further supported. A sidelink HARQ feedback is sent by a terminal device at the receiving end to a terminal device at the transmitting end on a PSFCH.

At present, according to communication standards, much research and standardization are performed on sidelink communication. For example, in Release 16 (Rel-16 or R16 for short), the RAN studies sidelink communication, which is mainly used to support an advanced V2X application. In Rel-17, the SA2 studies and standardizes proximity-based services, including public safety and business related services. As part of the Rel-17, energy saving solutions (such as, partial sensing, discontinuous reception (DRX)), and coordination among terminal devices have been developed in RAN1 and RAN2 to improve sidelink transmission reliability and reduce power consumption of a battery-limited terminal device.

Different RATs Coexist on a Same Channel

A market penetration rate of a sidewalk communications system may increase over time, for example, a market penetration rate of NR V2X may increase over time. However, in some scenarios, different V2X-based RATs may need to coexist in a co-channel scenario, that is, V2X devices of different RATs may coexist on a same frequency channel. For example, LTE V2X and NR V2X may exist in a same terminal device, that is, the LTE V2X and the NR V2X need to coexist in a co-channel scenario. Different RATs coexist on a same channel (or coexist on a common channel) to implement a higher data rate and support for a larger bandwidth of a non-intelligent transportation system (ITS) band. However, for an ITS band, the LTE V2X in the LTE V2X and the NR V2X may be prioritized to implement a basic safe V2X case in a relatively short time.

Therefore, it is necessary to enable a co-channel coexistence mechanism, which may ensure time alignment between slots of different RATs. It may be understood that, in some cases, for example, when a coexistence framework within Rel-16 devices is not supported, different RATs must use a same synchronization source. In this case, understanding of the time by the different RATs is the same and no intersystem inference will occur. However, synchronization sources between different RATs may be different, but this problem may occur only in a corner case, for example, when a terminal device moves outside a specific coverage with changes of associated synchronization sources. In this case, an implementation-based solution may be defined.

When the co-channel coexistence mechanism is enabled, an important aspect of a V2X deployment scenario needs to be considered, where an LTE V2X device and an NR V2X device coexist on a same frequency channel.

For a case in which devices of different RAT types coexist while using a common carrier frequency, it is important to establish a mechanism to effectively use resource allocation of a plurality of RATs without interfering with operation of each RAT. First, a design principle of the co-channel coexistence mechanism between different RATs may be discussed. The applicant believes that for LTE SL and NR SL, a basic design principle may be to ensure backward compatibility of R14/R15 LTE SL and R16/R17 NR SL. In addition, it is important to reuse the intra-device coexistence framework defined in Rel-16 as much as possible. Moreover, it is more necessary to consider that LTE SL has no performance degradation or has limited performance degradation. In other words, it is necessary to ensure that LTE performance is not degraded or LTE performance has only limited degradation as far as possible.

For a terminal device that includes a sidelink communications module, types of the terminal device may include, for example, a type A device to type E device described below. Type A device is a Rel-18 device, including LTE SL and NR SL. Type B device is a Rel-18 device, including only NR SL. Type C device is a Rel-14/Rel-15 device, including only LTE SL. Type D device is a Rel-16/17 device, including only NR SL. Type E device is a Rel-16 device, including LTE SL and NR SL. It may be learned that both the type A device and the type E device include two types of RATs, namely, LTE SL and NR SL.

It should be noted that the type A device should be the most important target device type of co-channel coexistence between the LTE SL and the NR SL in the Rel-18, and also be the most challenging scenario of co-channel coexistence between the NR SL and the LTE SL in the Rel-18. The type A device should include both an LTE SL module and an NR SL module.

In some embodiments, considering co-channel coexistence between SL mechanisms of a plurality of RATs, a terminal device may perform SL communication by using one or more resources from an SL resource pool corresponding to a type of a RAT for SL communication. For example, the terminal device may perform LTE SL communication by using one or more resources in an LTE SL resource pool. Alternatively, the terminal device may perform NR SL communication by using one or more resources in an NR SL resource pool.

However, in some cases, resource pools used by the terminal device for different RATs may overlap, for example, overlap in time and/or frequency domain. In this case, it may be considered that the resource pools used for different RATs are in a "co-channel coexistence" state. An example in which different RATs include LTE and NR is used as an example. A resource pool used by a terminal device for LTE SL may at least partially overlap a resource pool used by a terminal device in a same geographical area for NR SL (for example, overlaps in time and frequency domain). In other words, an LTE SL resource pool and an NR SL resource pool may be in a "co-channel coexistence" state.

Since SL resource pools for different RATs at least partially overlap in time and/or frequency, overlapping parts of SL resource pools for different RATs may interfere with or collide with each other at a physical level, because SL transmissions for different RATs may occur on any overlapping resource that uses overlapped SL resource pools, resulting in interference or collisions.

It should be noted that "transmission" mentioned in this embodiment of the present application may be understood as signal receiving and/or signal transmitting. In other words, the "transmission" mentioned in this embodiment of the present application may be replaced with "transceiver", "receiving and/or transmitting", or the like.

It may be learned from the foregoing description that different RATs used in a same terminal device may need to coexist in a same channel scenario. For example, LTE SL and NR SL modules located in a same terminal device may need to coexist in a co-channel scenario. Therefore, in a case in which the terminal device includes a plurality of SL-based RATs, interference may occur between the plurality of RATs.

To solve the foregoing problem, the present application proposes a method for communication and a terminal device, which can allocate, based on first information, resources (namely, the first resource set mentioned below) shared by a plurality of SL-based RATs included in a terminal device, thereby helping avoid transmission conflicts between the plurality of RATs in the terminal device.

With reference to the accompanying drawings, the following first describes method embodiments provided in the present application.

FIG. 3 is a schematic flowchart of a method for communication according to an embodiment of the present application. The method shown in FIG. 3 may be executed by a terminal device, and the terminal device may be, for example, any terminal device shown in FIG. 1 or FIG. 2.

The terminal device may include at least two different RATs, for example, different RATs based on SL. Alternatively, the terminal device may include at least two types of SL modules, and RATs corresponding to the at least two types of SL modules are different. The following uses an example in which the terminal device includes a first RAT and a second RAT for description.

A type of a RAT included in the terminal device is not specifically limited in this embodiment of the present application. For example, the terminal device may include an LTE SL module and an NR SL module. However, this embodiment of the present application is not limited thereto. The terminal device may alternatively include an LTE module, an SL module in a 6th generation communications system, and the like.

In this embodiment of the present application, the at least two different RATs included in the terminal device may coexist on a same channel. For example, the first RAT and the second RAT coexist on a same channel.

It should be noted that, a form presented in the terminal device by a RAT included in the terminal device is not limited in embodiments of the present application. For example, the first RAT or the second RAT may exist in the terminal device in a form of a module, a chip, or the like.

It should be further noted that the first RAT and the second RAT are not limited in this embodiment of the present application, provided that the first RAT and the second RAT are different RATs. In some embodiments, the first RAT may be LTE, and the second RAT may be NR. In some embodiments, the first RAT may be NR, and the second RAT may be LTE. In some embodiments, the first RAT may be NR, and the second RAT may be a RAT in a future communications system (such as the 6th generation communications system), or the like.

In some embodiments, a definition of the terminal device may include a capability of a first RAT SL module to share first information with a second RAT SL module. In some embodiments, the definition of the terminal device may further include a capability of the second RAT SL module to use the first information shared by the first RAT SL module to allow coexistence between the first RAT and the second RAT.

An example in which the terminal device includes an LTE SL module and an NR SL module is used. The definition of the terminal device may include a capability of the LTE SL module to share first information (for example, sensing information and resource reservation information) with the NR SL module in the terminal device, and a capability of the NR SL module to sense and reserve resource information in a resource selection process. In some embodiments, the NR SL module in the terminal device may further use the first information shared by an LTE SL module.

The method in FIG. 3 may include Step S310. In Step S310, the terminal device performs resource allocation for a first resource set based on first information.

The first resource set (a resource set may also be understood as a resource pool) is shared by the first RAT SL module and the second RAT SL module. Alternatively, the first resource set is a resource pool shared by the first RAT SL module and the second RAT SL module, that is, a resource in the first resource set may be used by the first RAT SL module, and may also be used by the second RAT SL module.

In some embodiments, the first resource set may also be understood as a cross resource in a resource pool corresponding to the first RAT SL module and a resource pool corresponding to the second RAT SL module. The cross resource may be shared by the first RAT SL module and the second RAT SL module. Therefore, in some embodiments, the first resource set may also be referred to as a shared resource set, a cross resource set, a shared resource pool, a cross resource pool, a shared resource, a cross resource, or the like. This is not limited in embodiments of the present application.

In some embodiments, performing, by the terminal device, resource allocation for the first resource set may be executed by the second RAT SL module. For example, the second RAT SL module may perform resource allocation for the first resource set based on the first information obtained from the first RAT SL module.

In some embodiments, performing, by the terminal device, resource allocation for the first resource set may be executed by the first RAT SL module. For example, the first RAT SL module may perform resource allocation for the first resource set based on information obtained from the second RAT SL module and associated with a resource of the second RAT SL module.

In some embodiments, performing, by the terminal device, resource allocation for the first resource set may be performed by another module different from the first RAT SL module and the second RAT SL module in the terminal device, for example, may be performed by a processor in the terminal device. In an implementation, the another module may obtain, from the first RAT SL module, information associated with a resource of the first RAT SL module, obtain, from the second RAT SL module, information associated with a resource of the second RAT SL module, and then perform resource allocation for the first resource set based on the obtained information.

In this embodiment of the present application, the terminal device can perform resource allocation for the first resource set based on the first information, where the first information is associated with a resource of the first RAT SL module. In other words, the terminal device can determine, based on information associated with a resource of the first RAT SL module, resources that should be used by the first RAT SL module and resources that should be used by the second RAT SL module in the first resource pool, thereby helping avoid a transmission conflict between the first RAT SL module and the second RAT SL module.

For ease of understanding, the following first describes the first information in detail.

In some embodiments, that the first information is associated with a resource of the first RAT SL module may be understood as that the first information may be used to indicate information related to the resource of the first RAT SL module. A resource of the first RAT SL module is not specifically limited in this embodiment of the present application, which may be any resource related to the first RAT SL module. For example, the resource may include a resource actually used by the first RAT SL module, a resource reserved for the first RAT SL module, a resource to be used by the first RAT SL module, a resource that can be used by the first RAT SL module, and the like.

In some embodiments, the information related to the resource of the first RAT SL module may include sensing information and/or resource reservation information corresponding to the first RAT SL module. In other words, in some embodiments, the first information may be used to indicate sensing information and/or resource reservation information corresponding to the first RAT SL module.

In some embodiments, the first RAT SL module may perform sensing on a channel to obtain sensing information. The sensing information may be, for example, used to indicate a sensing result obtained through sensing by the first RAT SL module. However, the present application is not limited to obtaining the sensing information through sensing. In some embodiments, the terminal device may alternatively obtain the sensing information in another manner, such as measurement. Therefore, in some embodiments, the sensing information may also be referred to as perception information, measurement information, a measurement result, or the like.

A type of the sensing information corresponding to the first RAT SL module is not specifically limited in this embodiment of the present application. For example, the sensing information may include one or more of the following information: sidelink reference signal received power (SL RSRP), sidelink reference signal received quality (SL RSRQ), and a sidelink received signal strength indicator (SL RSSI).

In a specific implementation, the terminal device may measure an RSSI parameter (for example, an SL RSSI parameter) associated with various sidelink channels to obtain a sensing result. Alternatively, the terminal device may measure an RSRP parameter (for example, a PSSCH-RSRP parameter) associated with various sidelink channels to obtain a sensing result. Alternatively, the terminal device may measure an RSRQ parameter (for example, a PSSCH-RSRQ parameter) associated with various sidelink channels to obtain a sensing result.

In the present application, there is no limitation on a signal and/or a channel corresponding to the first RAT SL module. In other words, the first RAT SL module may obtain a sensing result by sensing any signal and/or channel associated with the first RAT. For example, the sensing result may be determined based on measurement of a received signal that includes control information.

In some embodiments, the first information may be associated with one or more of the following: a reserved resource of the first RAT SL module, a transmission resource of the first RAT SL module, a sub-channel, sensing information, a candidate resource set, a logical subframe, a priority, and the like.

In some embodiments, the first information may include one or more of the following information: information related to a reserved resource of the first RAT SL module, information related to a reserved resource determined based on SCI decoding, sub-channel configuration information, sensing information, a candidate resource set, information related to a logical subframe, priority information, and information related to a transmission resource, and the like. The following describes in detail the information included in the first information.

The information related to a reserved resource of the first RAT SL module may include information related to a reserved resource determined by the first RAT SL module based on SCI decoding and/or information related to a reserved resource of the first RAT SL module. The reserved resource of the first RAT SL module may be a resource reserved for the first RAT SL module for transmission performed by the terminal device.

In some embodiments, the information related to a reserved resource may include one or more of the following information: a count value, a transmission time, a frequency location, a period, and the like. For example, the information related to a reserved resource of the first RAT SL module may include one or more of the following: a resource reservation counter value of the first RAT SL module, a transmission time of resource reservation of the first RAT SL module, a frequency location of resource reservation of the first RAT SL module, a period of resource reservation of the first RAT SL module, and the like.

In some embodiments, the information related to a reserved resource determined based on SCI decoding may include one or more of the following: a time and/or frequency location, determined based on SCI decoding, of the reserved resource of the first RAT SL module; a resource reservation period and an available resource, determined based on decoded SCI, for transmission in the first RAT SL; a priority, determined based on SCI decoding, of transmission in the first RAT SL; and the like.

The terminal device (for example, the second RAT SL module) may use the information related to a reserved resource of the first RAT SL module to avoid a transmission conflict between the first RAT SL module and the second RAT SL module. An example in which the first RAT is LTE and the second RAT is NR is used. An NR SL module may avoid a transmission conflict between an LTE SL module and the NR SL module based on a transmission time, a period, a counter value, and the like of resource reservation of the LTE SL module.

The sub-channel configuration information of the first RAT SL module may include one or more of the following information: a quantity of sub-channels, and a quantity of physical resource blocks (PRBs) of each sub-channel. It should be understood that the sub-channel configuration information is important for determining resource overlapping between different RATs. For example, the sub-channel configuration information of the first RAT SL module is important for determining, based on sensing information of a time location and a frequency location of the reserved resource of the terminal device that includes another first RAT, resource overlapping (such as frequency overlapping) between a reserved resource of the first RAT and a candidate resource of the second RAT.

In addition to the sub-channel configuration information, the sensing information of the first RAT SL module and priority information that is mentioned below are also important for determining resource overlapping between different RATs.

The sensing information of the first RAT SL module is not specifically limited in embodiments of the present application. For example, the sensing information may include the SL RSRP measurement result, the RSSI measurement result, and the like that are mentioned above.

In some embodiments, the candidate resource set of the first RAT SL module may include a candidate resource set SA and/or a candidate resource set SB.

In some embodiments, the information related to a logical subframe of the first RAT SL module may be used to indicate information related to a slot, a frame, a subframe, or the like of the first RAT. For example, the information related to the logical subframe of the first RAT SL module may be used to indicate information such as a frame structure of the first RAT.

The priority information may be used to indicate a priority associated with first RAT transmission. For example, the priority information may include a priority of the first RAT transmission and/or a priority of a service transmitted by using the first RAT. The priority information may be determined based on SCI decoding, or may be determined by the terminal device by means of transmission.

The information related to a transmission resource may be used to indicate information of a resource occupied by the first RAT SL module of the terminal device in an actual transmission process. The information related to a transmission resource may include, for example, a time location and/or a frequency location of a resource used for transmission by the first RAT SL module.

The first information may further include other information related to a transmission resource of the first RAT SL module. For example, the first information may include a resource corresponding to a half-duplex subframe that is not monitored by the terminal device of the first RAT. Alternatively, the first information may include an available resource, determined based on decoded SCI and/or transmission of the terminal device itself, of the first RAT.

As described above, based on the first information shared by the first RAT SL module, the second RAT SL module may implement resource allocation (such as resource selection, resource scheduling, and resource usage) to avoid resource conflicts. In some embodiments, the first information may further be used by the first RAT SL module. For example, the first RAT SL module may perform filtering on content of the first information shared with the second RAT SL module based on a parameter (information such as SL RSRP and priority) associated with reservation of a first RAT SL resource, so as to implement high utilization of the first RAT SL resource.

The following describes how to share the first information.

In some embodiments, sharing the first information by the first RAT SL module is actively initiated by the first RAT SL module. For example, the first RAT SL module may initiate sharing of the first information based on one or more of time, update of the first information, or preset.

In an implementation, when the first RAT SL module obtains basic information of an available resource (for example, obtains the basic information of the available resource by using the SCI decoding information), the first RAT SL module may actively indicate or update the first information. The basic information of the available resource obtained by the first RAT SL module is not specifically limited in embodiments of the present application. For example, the basic information of the available resource may include a resource period, a time-frequency resource length, and the like.

In another implementation, when the first information is updated, the first RAT SL module may actively indicate or update the first information.

In still another implementation, the first RAT SL module may actively indicate or update the first information based on time. For example, the first RAT SL module may actively indicate or update the first information at a fixed time interval.

In some embodiments, the first RAT SL module sharing the first information is initiated based on a request of another module (for example, the second RAT SL module). For example, another module may trigger, based on one or more of time, a service, preset and sensing information, the first RAT SL module to share the first information. The following separately uses an example in which another module is the second RAT SL module for description.

In an implementation, a trigger condition may be related to time. For example, the second RAT SL module may periodically acquire the first information shared by the first RAT SL module. For example, a period in which the second RAT SL module reads the first information may be represented, for example, by T. The second RAT SL module may trigger reading of the first information in a period of {T, 2T, 3T . . . }.

In another implementation, the trigger condition may be related to sensing information (or referred to as a sensing result) of the first RAT SL module. For example, if the sensing result of the first RAT SL module is less than or equal to a threshold, the second RAT SL module may obtain the first information. In other words, in response to that the sensing information of the first RAT SL module is less than or equal to the threshold, the second RAT SL module may obtain the first information. For example, if the sensing result of the first RAT SL module is less than or equal to a threshold, the first RAT SL module may send the first information to a MAC layer of the first RAT SL module. The MAC layer of the first RAT SL module triggers a MAC layer of the second RAT SL module, so that the MAC layer of the second RAT SL module triggers a physical layer of the second RAT SL module to read the first information.

The threshold may be preset, set by using higher layer signaling, or defined in a standard, which is not limited in embodiments of the present application.

The sensing information of the first RAT SL module may include one or more of the following measurement results: RSRP, RSRQ, and an RSSI.

It may be understood that, in a case that the sensing information of the first RAT SL module is less than or equal to a threshold, it may be considered that a coverage effect of the first RAT is poor, and a resource of the first RAT SL module may be released to the second RAT SL module for use. Therefore, using the sensing information to trigger sharing of the first information may optimize resource use of the first RAT SL module and the second RAT SL module.

In still another implementation, the trigger condition may be related to a service, that is, the trigger condition may include a service trigger condition. For example, the service trigger condition is associated with whether the second RAT SL module needs to send service data. In other words, when the service trigger condition is met, the second RAT SL module may obtain the first information, that is, in response to that the second RAT SL module needs to send service data, the second RAT SL module may acquire the first information.

In some embodiments, in a case in which the second RAT SL module needs to transmit one or more of information such as information transmitted by using an SL interface, information used to transmit coordination information between terminal devices, and service data, it may be considered that the second RAT SL module needs to transmit data.

In some communication systems (such as NR V2X), not all sidelink communication services are periodic. A service triggered by an event is unpredictable. For example, in an emergency, a terminal device may generate a braking message. Aperiodic service data, such as pre-collision warning information, triggered by some events is more important than periodically transmitted data. Fast and reliable transmission of the aperiodic information is essential. Therefore, for a sidelink transmission resource mode (namely, a mode 2) determined by the terminal device, a service triggered by an event needs to be quickly sensed, so that a generated message can be transmitted in a timely manner. It may be learned that, based on the technical solution of a trigger condition related to a service provided in the present application, the terminal device may quickly implement optimization of resource allocation, to avoid resource conflicts, so that a requirement of fast and reliable data transmission may be met.

A manner in which the second RAT SL module initiates a request for sharing the first information is not specifically limited in embodiments of the present application. In an implementation, the second RAT SL module may directly initiate a request to the first RAT SL module, to request for obtaining the first information. For example, the second RAT SL module may directly initiate a request to the first RAT SL module by using the shared interface mentioned below. In another implementation, the second RAT SL module may initiate a request to another module, so as to request for obtaining the first information shared by the first RAT SL module. For example, the second RAT SL module may initiate a request to the buffer mentioned below, to request for acquiring the first information shared by the first RAT SL module.

A manner in which the first RAT SL module shares the first information is not specifically limited in embodiments of the present application. The following provides several example implementations by using an example in which the first RAT SL module shares the first information with the second RAT SL module. It should be noted that an implementation in which the first RAT SL module shares the first information with another module inside the terminal device is similar. For brevity, details are not described again.

In an implementation, sharing of the first information may be implemented by using a buffer. For example, the first RAT SL module may write the first information to the buffer, and the second RAT SL module may read the first information from the buffer.

In another implementation, sharing of the first information may be implemented by using a shared interface. For example, a shared interface may be established between the first RAT SL module and the second RAT SL module, so as to implement sharing of the first information.

In some embodiments, the shared interface may be established between a physical layer of the first RAT SL module and a physical layer of the second RAT SL module. In some embodiments, the shared interface may be established between a higher layer of the first RAT SL module and a higher layer of the second RAT SL module, for example, may be established between a medium access control (MAC) layer of the first RAT SL module and a MAC layer of the second RAT SL module. In some embodiments, a shared interface may be established at both a physical layer and a higher layer (such as a MAC layer) of the first RAT SL module and the second RAT SL module.

In some embodiments, the second RAT SL module may further estimate a ratio of a service of a second RAT SL to a total service in a system based on information shared by the first RAT SL module on a shared interface or a common buffer, to better allocate resources.

Figure 5:
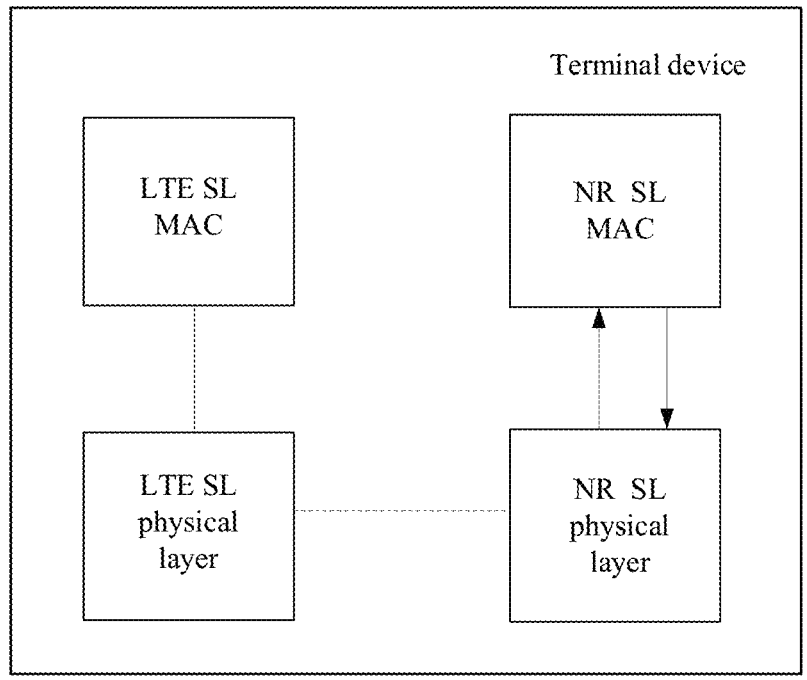
FIG. 5 is another implementation of sharing first information by a first RAT SL module and a second RAT SL module.

The following provide, by using an example in which the first RAT is LTE and the second RAT is NR, examples in which an LTE SL module and an NR SL module implement sharing of the first information by using a buffer and a shared interface with reference to FIG. 4 and FIG. 5, respectively.

FIG. 4 shows an example in which the LTE SL module and the NR SL module implement sharing of the first information by using a buffer. As shown in FIG. 4, the method shown in FIG. 4 may include Step S410 to Step S430.

In Step S410, the LTE SL module sends the first information to the buffer.

In Step S420, the NR SL module sends a first request message to the buffer, to request for obtaining the first information.

In other words, in the example shown in FIG. 4, sharing or acquiring of the first information is triggered by the NR SL module.

In Step S430, the NR SL module reads the first information from the buffer.

In response to the first request message, the NR SL module may read the first information from the buffer. In other words, in response to the first request message, the buffer may send the first information to the NR SL module.

It should be noted that a sequence of Step S410 and Step S420 is not limited in this embodiment of the present application. For example, the LTE SL module may first send the first information to the buffer, and in a case in which the buffer stores the first information, the NR SL module sends the first request message to the buffer. Alternatively, the NR SL module may first send the first request message to the buffer, and in response to the first request message, the LTE SL module may send the first information to the buffer.

FIG. 5 shows an example in which the LTE SL module and the NR SL module implement sharing of first information by using a shared interface. As shown in FIG. 5, both the LTE SL module and the NR SL module belong to an internal module of a terminal device, and a shared interface may be established between the LTE SL module and the NR SL module (for example, a shared interface is established on a physical layer), so that first information is directly transmitted between the LTE SL module and the NR SL module by using the shared interface. It should be noted that, in FIG. 5, both an LTE SL MAC layer and an LTE SL physical layer belong to the LTE SL module; and both an NR SL MAC layer and an NR SL layer belong to the NR SL module.

Based on the foregoing description of the first information and how to share the first information, the following describes in detail resource allocation performed by the terminal device on a first resource set based on the first information.

First, an SL resource set (SL resource pool) of the terminal device is briefly described.

In some embodiments, in frequency domain, one SL resource pool may include one or more consecutive sub-channels, for example, may include numSubchannel consecutive sub-channels. In some embodiments, one sub-channel may include one or more consecutive PRBs, for example, may include subchannelsize consecutive PRBs.

In some embodiments, numSubchannel and subchannelsize may be higher-layer parameters.

In some embodiments, the SL resource set of the terminal device may be divided into three parts, which are respectively a first part, a second part, and a third part. Resources in the first part may be used only by a first RAT SL module. Resources in the second part may be used only by a second RAT SL module. Resources in the third part form the first resource set mentioned in this embodiment of the present application, and the first resource set may be used by the first RAT SL module, and may also be used by the second RAT SL module.

It should be noted that in some embodiments, the resources in the first part may include a reserved resource, a dedicated resource, or a preconfigured resource of the first RAT SL module. The resources in the second part may include a reserved resource, a dedicated resource, or a preconfigured resource of the second RAT SL module.

As described above, in some embodiments, resource allocation (such as resource use and resource scheduling) of the first resource set may be performed by the second RAT SL module. For ease of description, the following uses an example in which the second RAT SL module performs resource allocation on the first resource set. A process in which the first RAT SL module or another module in the terminal device performs resource allocation on the first resource set is similar, and reference may be made to the description in which the second RAT SL module performs resource allocation on the first resource set.

In some embodiments, resource allocation of the first resource set may be performed by a higher layer (for example, a MAC layer) of the second RAT SL module. In other words, the use and allocation of the first resource set may be scheduled and allocated by the higher layer of the second RAT SL module. That the second RAT is NR is used as an example, and resource allocation of the first resource set may be performed at a higher layer of an NR SL module.

In some embodiments, the second RAT SL module may determine the first resource set based on a candidate resource set SA or SB shared by the first RAT SL module. For example, the first RAT SL module may generate the candidate resource set SB at a physical layer, and report the candidate resource set SB to a higher layer (for example, a MAC layer). The first RAT SL module may further share information about the candidate resource set SB with the second RAT SL module by using a shared interface or a buffer, to facilitate the second RAT SL module to determine the first resource set. For example, the first resource set may be a cross resource of the first RAT SL module and the second RAT SL module. Alternatively, the first resource set may be a part of a cross resource between the first RAT SL module and the second RAT SL module.

Based on this, the second RAT SL module may select a resource from the first resource set and use the resource, to avoid selecting resources of a terminal device that are evaluated as interfering with coexistence of the first RAT SL module and the second RAT SL module. An example in which the first RAT is LTE and the second RAT is NR is used, and a MAC layer of an NR SL module may select a resource from an intersection set (the first resource set) of candidate resource sets obtained from the NR SL module and the LTE SL module. Therefore, resources evaluated as interfering NR and LTE SL terminal devices may be avoided.

In some embodiments, the terminal device performing resource allocation for the first resource set may be understood as that the terminal device allocates resources in the first resource set to different RATs for use. For example, the terminal device allocates some resources in the first resource set to the first RAT SL module for use, and/or allocates some resources in the first resource set to the second RAT SL module for use, and the like.

In some embodiments, the terminal device performing resource allocation for the first resource set may be understood as that the terminal device determines, from the first resource set, a resource that can be used by the first RAT SL module (or determining, from the first resource set, a resource that can be used for the first RAT SL module).

In some embodiments, the terminal device performing resource allocation for the first resource set may be understood as that the terminal device determines, from the first resource set, a resource that can be used by the second RAT SL module.

In an implementation, that the terminal device performs resource allocation for a first resource set based on first information may include: The terminal device (for example, the second RAT SL module) performs resource exclusion for the first resource set based on the first information, so as to determine a resource that can be used for the second RAT SL module. Alternatively, the terminal device may perform resource exclusion for the first resource set based on the first information to obtain a second resource set, where the second resource set is used to determine a resource, in the first resource set, capable of being used by the second RAT SL module.

For ease of understanding, by using an example in which the terminal device performing allocation for the first resource set is understood as that the terminal device determines, from the first resource set, a resource that can be used by the second RAT SL module, the following provides an example in which the terminal device performs resource allocation for the first resource set. It should be noted that a method in which the terminal device determines, from the first resource set, a resource that can be used for the first RAT SL module is similar. For example, the first RAT SL module may acquire, from the second RAT SL module, information associated with a resource of the second RAT SL module, and then perform resource allocation based on the acquired information. For brevity, details are not described in the present application.

Because the first RAT SL module and the second RAT SL module may share the first information, the second RAT SL module may perform resource exclusion based on the first information shared by the first RAT SL module and control information or sensing information obtained through measurement by the second RAT SL module. The first information mentioned herein may include, for example, resource reservation information and/or sensing information shared by the first RAT SL module, such as SCI and RSRP information shared by the first RAT SL module, a time location and a frequency location of a resource shared by the first RAT SL module, a resource reservation period, and a priority of decoded first RAT SCI. In some embodiments, a time location and a frequency location of a resource and a resource reservation period of a decoded first RAT SCI may be used to identify a set of periodic resources. For detailed content of the first information, reference may be made to the foregoing description. Details are not described herein again.

For example, that the first RAT is LTE and the second RAT is NR is used as an example. For a terminal device in which an LTE SL module and an NR SL module coexist, the LTE SL module may share sensing information and/or resource reservation information with the NR SL module by using a shared interface or a buffer. The physical layer of the NR SL module is expected to perform resource exclusion based on decoded NR SCI and an RSRP measured at the NR SL module and LTE SCI and RSRP information shared by the LTE SL module.

In some embodiments, the first resource set includes a first candidate resource, or the first candidate resource may be any resource in the first resource set. In this case, the terminal device (for example, the second RAT SL module)

may determine, based on a specific condition, whether the first candidate resource can be used by the second RAT SL module.

For example, when the first condition is met, the terminal device may exclude the first candidate resource from the first resource set. In other words, when the first condition is met, the terminal device determines that the first candidate resource cannot be used by the second RAT SL module, or when the first condition is met, the terminal device does not use the first candidate resource as a candidate resource of the second RAT SL module.

In some embodiments, the first condition is associated with one or more of the following: a resource reserved for the first RAT SL module, a resource associated with an unmonitored subframe of the first RAT SL module, signal quality of a measured sidelink signal, and a service priority.

For example, the first condition may be associated with a resource reserved for the first RAT SL module. For example, when the first condition may include that the first candidate resource overlaps with the resource reserved for the first RAT SL module, the terminal device does not use the first candidate resource as a candidate resource of the second RAT SL module. Therefore, when the first candidate resource does not overlap the resource reserved for the first RAT SL module, the terminal device may consider using the first candidate resource as a candidate resource of the second RAT SL module.

Alternatively, the first condition may be associated with both a resource reserved for the first RAT SL module and measured signal quality of a sidelink signal. For example, when the first condition may include that the first candidate resource overlaps with the resource reserved for the first RAT SL module and that the signal quality of the sidelink signal measured by the first RAT SL module is higher than a threshold, the terminal device does not use the first candidate resource as a candidate resource of the second RAT SL module; otherwise, the terminal device may consider the first candidate resource as a candidate resource of the second RAT SL module.

In some embodiments, the first condition may include one or more of the following conditions: the first candidate resource or a periodic resource corresponding to the first candidate resource overlaps with the resource reserved for the first RAT SL module; the first candidate resource or the periodic resource corresponding to the first candidate resource overlaps with the resource associated with an unmonitored subframe of the first RAT SL module; signal quality, measured by first RAT SL module, of the sidelink signal is higher than a first signal quality threshold; a priority of a service transmitted by the first RAT SL module is higher than a priority of a service transmitted by the second RAT SL module; a priority of a service transmitted by another first RAT SL terminal device is higher than a priority of a service transmitted by the second RAT SL module; and signal quality, measured by the another first RAT SL terminal device, of a sidelink signal is higher than the first signal quality threshold.

It should be noted that, the another first RAT SL terminal device mentioned in this embodiment of the present application and the first RAT SL module mentioned in this embodiment of the present application belong to different terminal devices, or another first RAT SL terminal device mentioned in this embodiment of the present application and the second RAT SL module mentioned in this embodiment of the present application belong to different terminal devices. The first RAT SL module and the second RAT SL module belong to a same terminal device.

In some embodiments, the terminal device may perform resource exclusion according to one of the foregoing first conditions. For example, if the first candidate resource or a periodic resource corresponding to the first candidate resource overlaps with the resource reserved for the first RAT SL module, the terminal device determines that the first candidate resource is excluded. In this case, it may be understood that the first candidate resource may be reserved for the first RAT SL module for use. For another example, if the signal quality, measured by first RAT SL module, of the sidelink signal is higher than a first signal quality threshold, the terminal device determines that the first candidate resource is excluded. In this case, it may be understood that coverage of the first RAT SL module is good, and the first candidate resource may be reserved for the first RAT SL module for use. For another example, if the priority of a service transmitted by the first RAT SL module is higher than the priority of a service transmitted by the second RAT SL module, the terminal device determines that the first candidate resource is excluded. In this case, it may be understood that the service transmitted by the first RAT SL module is more important or urgent, and the first candidate resource may be reserved for the first RAT SL module for use.

In some embodiments, the terminal device may perform resource exclusion according to a plurality of (at least two of) the foregoing first conditions. For example, if the first candidate resource or a periodic resource corresponding to the first candidate resource overlaps with the resource reserved for the first RAT SL module, and the signal quality, measured by first RAT SL module, of the sidelink signal is higher than a first signal quality threshold, the terminal device determines that the first candidate resource is excluded and reserves the first candidate resource for the first RAT SL module for use. For another example, if the first candidate resource or a periodic resource corresponding to the first candidate resource overlaps with the resource reserved for the first RAT SL module, and the priority of a service transmitted by the first RAT SL module is higher than the priority of a service transmitted by the second RAT SL module, the terminal device determines that the first candidate resource is excluded and reserves the first candidate resource for the first RAT SL module for use. For another example, if the priority of the service transmitted by another first RAT SL terminal device is higher than the priority of the service transmitted by the second RAT SL module, and the signal quality, measured by the another first RAT SL terminal device, of a sidelink signal is higher than the first signal quality threshold, the terminal device determines that the first candidate resource is excluded and reserves the first candidate resource for the another first RAT SL module for use.

It should be noted that the foregoing enumeration is merely an example, and the terminal device may perform resource exclusion according to any one or more of the foregoing first conditions. For example, the terminal device may perform resource exclusion according to any three or more of the first conditions, and the like. This is not limited in embodiments of the present application.

Figure 6:
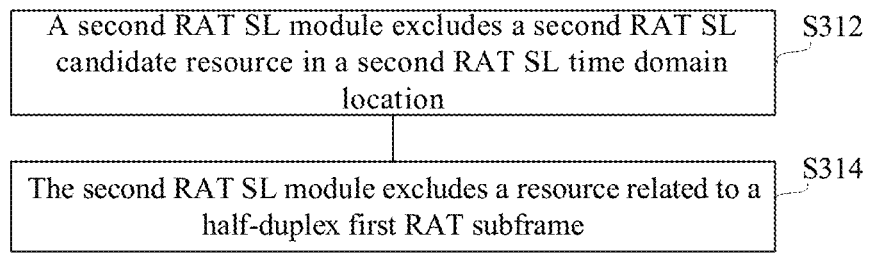
FIG. 6 is a possible implementation of Step S310.

Referring to FIG. 6, in some embodiments, that the terminal device performs resource exclusion based on first information may include Step S312 and Step S314, or in some embodiments, Step S310 mentioned above may include Step S312 and Step S314.

In Step S312, a second RAT SL module excludes a second RAT SL candidate resource in a second RAT SL time domain location. The second RAT SL time domain location overlaps with a first RAT SL resource selected for SL transmission of the first RAT SL module.

For example, a MAC/physical layer of an NR SL module may exclude an NR SL candidate resource in an NR SL slot, and the NR SL slot overlaps with an LTE SL resource selected for LTE SL transmission of an LTE SL module.

In Step S314, the second RAT SL module excludes a resource related to a half-duplex (non-monitored) first RAT subframe.

For example, when a first candidate resource or a periodic resource corresponding to the first candidate resource overlaps with a resource associated with an unmonitored subframe of the first RAT SL module, the second RAT SL module may exclude the first candidate resource.

In some embodiments, for a resource associated with an unmonitored subframe of the first RAT SL, reservation of the first RAT SL resource relates to a periodical reserved resource of an unmonitored first RAT SL UE or another first RAT SL UE.

In some embodiments, a resource pool of the first RAT SL module may include a resource not monitored or a resource reserved for another first RAT SL UE. In other words, a time resource and a frequency resource not monitored or a time resource and a frequency resource reserved for another first RAT SL UE may also belong to a first RAT SL resource pool.

In some embodiments, the time resource and the frequency resource not monitored or the time resource and the frequency resource reserved for the another first RAT SL UE may be repeated Q times according to a first RAT SL resource reservation period (or referred to as a resource retention period). The purpose of Q is to exclude a candidate resource of the second RAT SL module.

In some embodiments, considering that both first RAT SL and second RAT SL have Q values, to avoid a resource collision, a value of a repetition Q may be determined based on a larger value of the Q value of the first RAT SL and the Q value of the second RAT SL. In other words, in some embodiments, $Q=\max(Q_{rat1}, Q_{rat2})$; or in some embodiments, $Q=K*\max(Q_{rat1}, Q_{rat2})$, where K is a rational number that is not zero.

In some embodiments, for a definition of $Q_{rat1}$, reference may be made to the LTE SL Q formula in section 14.1.1.6 of TS 36.213. Specifically, $$Q_{rat1} = \begin{cases} \frac{1}{P_{rsvp\_RX}}, & P_{rsvp\_RX} < 1 \text{ and } n' - m \leq P_{step} \times P_{rsvp\_RX} \\ 1, & \text{Other} \end{cases}$$

For a definition of each parameter in the calculation formula of $Q_{rat1}$, reference may be made to related definitions in section 14.1.1 of TS 36.213. Details are not described herein again.

In some embodiments, for a definition of $Q_{rat2}$, reference may be made to the NR SL Q formula in section 8.1.4 of TS 38.214. Specifically, $$Q_{rat2} = \begin{cases} \left\lceil \frac{T_{scal}}{P_{rsvp\_RX}} \right\rceil, & P_{rsvp\_RX} < T_{scal} \text{ and } n' - m \leq P_{step} \times P'_{rsvp\_RX} \\ 1, & \text{Other} \end{cases}$$

For a definition of each parameter in the calculation formula of $Q_{rat2}$, reference may be made to related definitions in section 8.1.4 of TS 38.214. Details are not described herein again.

In some embodiments, conversion of a same resource reservation period of the first RAT SL may be performed by the second RAT SL module, so that the second RAT SL module may accurately determine a periodic reserved resource of the first RAT SL.

It may be learned from the foregoing description that, in some embodiments, the terminal device may consider priority information of a service when performing resource exclusion based on the first information. The following describes performing resource exclusion based on the priority information of a service in more detail.

In some embodiments, if a priority of a service transmitted by the first RAT SL module is high, the second RAT SL module (for example, a MAC layer/a physical layer of the second RAT SL module) excludes a candidate resource that overlaps a resource reserved for the first RAT SL module (the candidate resource is a resource in the first resource set, and a meaning of a candidate resource mentioned below is the same, and details are not described below). In other words, the second RAT SL module does not select a resource that overlaps a resource reserved for the first RAT SL module for SL transmission, or the second RAT SL module selects a resource that does not overlap a resource reserved for the first RAT SL module for SL transmission. That the first RAT is LTE and the second RAT is NR is used as an example. If a priority of a service of a UE LTE SL is high, a candidate resource (for example, an NR SL candidate resource, where the NR SL candidate resource is a resource in the first resource set) that overlaps a resource reserved for an LTE SL of an LTE SL UE is excluded at a MAC/physical layer of an NR SL module, that is, an NR SL device selects a resource that does not overlap a transmission resource reserved for an LTE SL device for SL transmission.

In some embodiments, if a priority of a service transmitted by the first RAT SL module is high, the second RAT SL module excludes a candidate resource that overlaps a resource reserved for the first RAT SL module and a resource reserved for another first RAT SL UE. In other words, the second RAT SL module does not select a resource that overlaps the resource reserved for the first RAT SL UE, or the second RAT SL module selects a resource that does not overlap the resource reserved for the first RAT SL UE. That the first RAT is LTE and the second RAT is NR is used as an example. If a priority of a service of a UE LTE SL is high, a candidate resource (for example, an NR SL candidate resource) that overlaps a resource reserved for the LTE SL of an LTE SL UE and a resource reserved for another UE LTE SL is excluded at a MAC/physical layer of an NR SL module. That is, an NR SL device selects a resource that does not overlap with a resource (including a resource reserved for transmission of an LTE SL and a resource of another UE LTE SL) reserved for the LTE SL device.

In some embodiments, if a priority of a service transmitted by the first RAT SL module is high, the second RAT SL module excludes a candidate resource that overlaps a resource reserved for the first RAT SL module. If a priority of a service of another first RAT SL UE is higher than a priority of a service transmitted by the second RAT SL module, the first RAT SL module may exclude a resource reserved for the another first RAT SL UE. In other words, the second RAT SL module may exclude transmission resources of all first RAT SLs. That the first RAT is LTE and the second RAT is NR is used as an example. If a priority of a service of a UE LTE SL is high, an NR SL candidate resource that overlaps a resource reserved for the LTE SL of an LTE SL UE is excluded at a MAC/physical layer of an NR SL module. If a priority of a service of another UE LTE SL is higher than a priority of a service of an NR SL service, the NR SL may exclude these resources. That is to say, all transmission resources of the LTE SL are excluded at the MAC/PHY layer of the NR SL module.

In some embodiments, if a priority of a service transmitted by the first RAT SL module is high, the second RAT SL module excludes a candidate resource that overlaps a resource reserved for the first RAT SL module. If a priority of a service of the another first RAT SL UE is lower than a priority of a service transmitted by the second RAT SL module, when a signal quality measurement value of an SL signal associated with a resource reserved for a first RAT SL is higher than a first signal quality threshold, the second RAT SL module excludes a candidate resource that overlaps a resource reserved for the another first RAT SL UE. That the first RAT is LTE and the second RAT is NR is used as an example. If a priority of a service of a UE LTE SL is high, an NR SL candidate resource that overlaps a resource reserved for the LTE SL of an LTE SL UE is excluded at a MAC/physical layer of an NR SL module. If a priority of a service of the another UE LTE SL is lower than a priority of an NR SL service, when an SL RSRP value associated with a resource reserved for the LTE SL is higher than a first signal quality threshold, an NR SL candidate resource that overlaps with a resource reserved for the LTE SL of the another LTE SL UE is excluded at a physical layer of an NR SL module.

In some embodiments, if a priority of a service of the another first RAT SL UE is higher than a priority of a service of the second RAT SL module, and when a signal quality measurement value of an SL signal associated with a resource reserved for the first RAT SL is higher than one or more of the following thresholds, the second RAT SL module excludes a candidate resource that overlaps with a resource reserved for the another first RAT SL UE, and the candidate resource may be preferentially used on the first RAT SL. The foregoing thresholds include a threshold corresponding to a resource pool of the first RAT SL module, a threshold corresponding to a resource pool of the second RAT SL module, and a threshold corresponding to a first resource set.

For example, if a priority of a service of the another LTE SL UE is higher than a priority of the NR SL service, and when a measured RSRP value associated with a resource reserved for the LTE SL is higher than one or more of the threshold corresponding to a resource pool of the first RAT SL module, the threshold corresponding to a resource pool of the second RAT SL module, and the threshold corresponding to the first resource set, a candidate resource that overlaps with a resource reserved for the LTE SL of the another LTE SL UE may be excluded at the physical layer of the NR SL module, and the candidate resource (a cross resource or a dynamic resource) may be preferentially used on the LTE SL.

In some embodiments, if a priority of a service of the another first RAT SL UE is higher than a priority of a service of the second RAT SL module, and when a signal quality measurement value of an SL signal associated with a resource reserved for the first RAT SL is higher than a threshold corresponding to the resource pool of the first RAT SL module and/or lower than a threshold corresponding to the resource pool of the second RAT SL module, the second RAT SL module excludes a candidate resource that overlaps with a resource reserved for the another first RAT SL UE, and the candidate resource may be preferentially used on the first RAT SL.

For example, if a priority of a service of the another LTE SL UE is higher than a priority of a service of an NR SL module, and when a measured RSRP value associated with a resource reserved for the LTE SL is higher than a threshold corresponding to a resource pool of the first RAT SL module and/or is lower than the threshold corresponding to a resource pool of the second RAT SL module, an NR SL candidate resource that overlaps with a resource reserved for the LTE SL of the another LTE SL UE is excluded at the physical layer of the NR SL module, and the candidate resource may be preferentially used on the LTE SL.

In some embodiments, if a priority of a service of the another first RAT SL UE is higher than a priority of a service of the second RAT SL module, and when a signal quality measurement value of an SL signal associated with a resource reserved for a first RAT SL is higher than the threshold corresponding to a resource pool of the first RAT SL module and/or is higher than a threshold corresponding to a first resource pool and/or is lower than the threshold corresponding to a resource pool of the second RAT SL module, the second RAT SL module excludes a candidate resource that overlaps with a resource reserved for the another first RAT SL UE, and the candidate resource may be preferentially used on the first RAT SL.

For example, if a priority of a service of the another LTE SL UE is higher than a priority of a service of the NR SL module, and when the measured RSRP value associated with a resource reserved for the LTE SL is higher than the threshold corresponding to a resource pool of the first RAT SL module and/or is higher than the threshold corresponding to the first resource pool, and/or is lower than the threshold corresponding to a resource pool of the second RAT SL module, the NR SL candidate resource that overlaps with a resource reserved for the LTE SL of the another LTE SL UE is excluded at the physical layer of the NR SL module, and the candidate resource may be preferentially used for the another LTE SL UE.

In some embodiments, if a priority of a service of the another first RAT SL UE is lower than a priority of a service of the second RAT SL module, and when a signal quality measurement value of an SL signal associated with a resource reserved for a first RAT SL is higher than one or more of the following thresholds, the second RAT SL module does not exclude a candidate resource that overlaps with a resource reserved for the another first RAT SL UE, and the candidate resource may be preferentially used on the second RAT SL. The foregoing thresholds include a threshold corresponding to a resource pool of the first RAT SL module, a threshold corresponding to a resource pool of the second RAT SL module, and a threshold corresponding to a first resource set.

For example, if a priority of a service of the another LTE SL UE is lower than a priority of the NR SL service, and when a measured RSRP value associated with a resource reserved for the LTE SL is higher than one or more of the threshold corresponding to a resource pool of the first RAT SL module, the threshold corresponding to a resource pool of the second RAT SL module, and the threshold corresponding to the first resource set, the NR SL candidate resource that overlaps with a resource reserved for the LTE SL of the another LTE SL UE may be not excluded at the physical layer of the NR SL module, and the candidate resource may be preferentially used on the NR SL.

In some embodiments, if a priority of a service of the another first RAT SL UE is lower than a priority of a service of the second RAT SL module, and when a signal quality measurement value of an SL signal associated with a resource reserved for the first RAT SL is higher than a threshold corresponding to the resource pool of the first RAT SL module and/or lower than a threshold corresponding to the resource pool of the second RAT SL module, the second RAT SL module excludes a candidate resource that overlaps with a resource reserved for the another first RAT SL UE, and the candidate resource may be preferentially used on the first RAT SL.

For example, if a priority of a service of the another LTE SL UE is lower than a priority of a service of an NR SL module, and when a measured RSRP value associated with a resource reserved for the LTE SL is higher than the threshold corresponding to a resource pool of the first RAT SL module and/or is lower than the threshold corresponding to a resource pool of the second RAT SL module, an NR SL candidate resource that overlaps with a resource reserved for the LTE SL of the another LTE SL UE is excluded at the physical layer of the NR SL module, and the candidate resource may be preferentially used on the LTE SL.

In some embodiments, if a priority of a service of the another first RAT SL UE is lower than a priority of a service of the second RAT SL module, and when a signal quality measurement value of an SL signal associated with a resource reserved for the first RAT SL is higher than the threshold corresponding to a resource pool of the first RAT SL module and/or is higher than the threshold corresponding to the first resource pool and/or is lower than the threshold corresponding to a resource pool of the second RAT SL module, the second RAT SL module does not exclude a candidate resource that overlaps with a resource reserved for the another first RAT SL UE, and the candidate resource may be preferentially used on the second RAT SL.

For example, if a priority of a service of the another LTE SL UE is lower than a priority of a service of the NR SL module, and when the measured RSRP value associated with a resource reserved for an LTE SL is higher than the threshold corresponding to a resource pool of the first RAT SL module and/or is higher than the threshold corresponding to the first resource pool, and/or is lower than the threshold corresponding to a resource pool of the second RAT SL module, the NR SL candidate resource that overlaps with a resource reserved for the LTE SL of the another LTE SL UE is not excluded at the physical layer of the NR SL module, and the candidate resource may be preferentially used on the NR SL.

In some embodiments, if measured signal quality associated with a resource reserved for the first RAT SL module is N times the threshold corresponding to the first resource set, or if measured signal quality associated with a resource reserved for the first RAT SL is N times the threshold corresponding to the first resource set, a resource allocated by the terminal device to the first RAT SL module in the first resource set and a resource allocated for transmission of a PSFCH are N*M times a resource allocated to the second RAT SL module, and M is a positive integer. For example, if a measured RSRP value associated with a resource reserved for the LTE SL is N times the threshold corresponding to the first resource pool, a shared resource allocated to the LTE SL and a resource allocated for transmission of the PSFCH are N*M times a shared resource allocated to the NR SL.

In some embodiments, if N*M is greater than a first target value, in the first resource set, a quantity of the resource allocated by the terminal device to the first RAT SL module and the resource allocated for transmission of the PSFCH is the first target value, and the first target value is a resource use threshold corresponding to the first resource set. Alternatively, the first target value is a maximum resource threshold used for the first resource set. In this way, it may be ensured that a minimum allocated resource is provided for another mode (for example, the second RAT SL).

In the foregoing description of the first condition, the first signal quality threshold is mentioned, and the following describes the first signal quality threshold.

In some embodiments, the first signal quality threshold may be an RSRP threshold. In some embodiments, the first signal quality threshold may be an RSRQ threshold. In some embodiments, the first signal quality threshold may be an RSSI threshold. This is not limited in embodiments of the present application.

In some embodiments, the first signal quality threshold may be preconfigured or predefined in a protocol.

In some embodiments, the first signal quality threshold may be determined based on one or more of the following: the priority of the service transmitted by the first RAT SL module, and the priority of the service transmitted by the second RAT SL module. For example, the first signal quality threshold may be determined based on a priority of decoded first RAT SCI and a priority of transmission in the second RAT SL. That the first RAT is LTE and the second RAT is NR is used as an example. The first signal quality threshold may be determined based on a priority of decoded LTE SCI and a priority of transmission in the NR SL.

In some embodiments, the priority of the service transmitted by the first RAT SL module may also be understood as a priority transmitted by the first RAT SL module, and the priority of the service transmitted by the second RAT SL module may also be understood as a priority transmitted by the second RAT SL module.

It should be noted that in V2X (for example, LTE-V2X), when each piece of packet data is generated by a higher layer, the higher layer allocates a priority (PPP) to the packet data, and the priority information is transmitted to a physical layer and used as a part of SCI for encoding. In this way, in a process of resource selection based on the first information (for example, sensing information), a device (for example, the second RAT SL module or another terminal device) that performs resource selection may retrieve and consider the priority information when resource exclusion is performed. To some extent, packet data with a higher priority is protected in a specific sense (for example, packet data with a higher priority is more important or urgent), and an SL resource reserved for the packet data with a higher priority is likely to be excluded from selection by a device (for example, the second RAT SL module, or another terminal device) that performs resource selection. Otherwise, if no SL resource is reserved for packet data with a higher priority, and a resource pool is severely congested, transmission of the data packet cannot be ensured.

In some embodiments, in an LTE SL deployment, a priority value may be used to prioritize transmissions. The SCI may include three bits of priority, where a priority value comes from a higher layer in the data packet. Specifically, quality of service (QOS) that processes V2X on the PC5 is described in TS23.285. In LTE V2X, a priority in an SCI format is used for power allocation between SL and uplink transmissions. Similar to the LTE SL, the NR SL may also require an SCI format, including a priority value provided by a higher layer.

In some embodiments, the first signal quality threshold may be determined based on a first threshold set. The following describes the first threshold set in detail.

In some embodiments, the first threshold set may include one or more of the following: one or more thresholds corresponding to the resource pool of the first RAT SL module, one or more thresholds corresponding to the resource pool of the second RAT SL module, and one or more thresholds corresponding to the first resource set.

In some embodiments, the first threshold set may be preconfigured, for example, preconfigured by a network.

In some embodiments, the one or more thresholds corresponding to the first resource set may be included in RP configuration of the second RAT SL module.

In some embodiments, each threshold in one or more thresholds corresponding to the first resource set may be determined based on the one or more thresholds corresponding to the resource pool of the first RAT SL module and the one or more thresholds corresponding to the resource pool of the second RAT SL module.

In an implementation, a threshold corresponding to the first resource set may be an average value of a threshold corresponding to the resource pool of the first RAT SL module and a threshold corresponding to the resource pool of the second RAT SL module.

For example, $RSRP_{sl} = (RSRP_{rat1} + RSRP_{rat2})/2$, where $RSRP_{sl}$ denotes a threshold in the one or more thresholds corresponding to the first resource set, $RSRP_{rat1}$ denotes the one or more thresholds corresponding to the resource pool of the first RAT SL module, and $RSRP_{rat2}$ denotes the one or more thresholds corresponding to the resource pool of the second RAT SL module.

In another implementation, the threshold corresponding to the first resource set may be determined based on a proportion of a threshold corresponding to the resource pool of the first RAT SL module and a proportion of a threshold corresponding to the resource pool of the second RAT SL module.

For example, $RSRP_{sl} = \alpha * RSRP_{rat1} + \beta * RSRP_{rat2}$, where $RSRP_{sl}$ denotes a threshold in the one or more thresholds corresponding to the first resource set, $RSRP_{rat1}$ denotes the one or more thresholds corresponding to the resource pool of the first RAT SL module, $RSRP_{rat2}$ denotes the one or more thresholds corresponding to the resource pool of the second RAT SL module, and both $\alpha$ and $\beta$ are numbers greater than 0 and less than or equal to 1.

In some embodiments, values of $\alpha$ and $\beta$ may be different for different service types or different service priorities. For example, a higher service level or a higher service priority may correspond to smaller values of $\alpha$ and $\beta$. However, the embodiments of the present application are not limited thereto. For example, a higher service level or a higher service priority may correspond to greater values of $\alpha$ and $\beta$. In other words, in some embodiments, the values of $\alpha$ and $\beta$ may be adaptively changed depending on a service type or a service priority.

The following provides several implementations of the first threshold set.

Implementation 1:

The first threshold set may include a plurality of thresholds corresponding to the resource pool of the first RAT SL module, and/or a plurality of thresholds corresponding to the resource pool of the second RAT SL module, and/or a plurality of thresholds corresponding to the first resource set. In some embodiments, it may also be understood that the first threshold set may include a threshold list corresponding to the resource pool of the first RAT SL module, and/or a threshold list corresponding to the resource pool of the second RAT SL module, and/or a threshold list corresponding to the first resource set.

In some embodiments, the plurality of thresholds or threshold lists are determined based on one or more of the following: a service type, a time domain resource location, and a resource block in a resource pool. In other words, in some embodiments, different threshold lists may be configured for one or more of different service types, different time domain resource locations (for example, slots), and different resource blocks in a resource pool.

That is to say, in some embodiments, the plurality of thresholds or the threshold list corresponding to the resource pool of the first RAT SL module are determined based on one or more of the following: a type of a service transmitted by the first RAT SL module, a time domain resource location, and a resource block in the resource pool of the first RAT SL module.

In some embodiments, the plurality of thresholds or the threshold list corresponding to the resource pool of the second RAT SL module are determined based on one or more of the following: a type of a service transmitted by the second RAT SL module, a time domain resource location, and a resource block in the resource pool of the second RAT SL module.

In some embodiments, the plurality of thresholds or the threshold list corresponding to the first resource set are determined based on one or more of the following: a type of a service transmitted by using the first resource set, a time domain resource location, and a resource block in the first resource set.

In some embodiments, the threshold list corresponding to the first resource set may be configured to be the same as the threshold list corresponding to the resource pool of the first RAT SL module or the threshold list corresponding to the resource pool of the second RAT SL module.

In some embodiments, the threshold list corresponding to the first resource set may be configured to be different from the threshold list corresponding to the resource pool of the first RAT SL module and the threshold list corresponding to the resource pool of the second RAT SL module. Alternatively, the threshold list corresponding to the first resource set may be a new threshold list.

In some embodiments, the threshold list corresponding to the first resource set is determined based on the threshold list corresponding to the resource pool of the first RAT SL module and the threshold list corresponding to the resource pool of the second RAT SL module. Alternatively, each threshold in the threshold list corresponding to the first resource set is determined based on the threshold list corresponding to the resource pool of the first RAT SL module and the threshold list corresponding to the resource pool of the second RAT SL module.

In an implementation, the threshold list corresponding to the first resource set may be an average value of the threshold list corresponding to the resource pool of the first RAT SL module and the threshold list corresponding to the resource pool of the second RAT SL module.

For example, $RSRP_{sl}^{set} = (RSRP_{lte}^{set} + RSRP_{nr}^{set})/2$, where $RSRP_{sl}^{set}$ denotes a threshold list corresponding to the first resource set or a threshold in the threshold list, $RSRP_{lte}^{set}$ denotes a threshold list corresponding to a resource pool of the first RAT SL module, and $RSRP_{nr}^{set}$ denotes a threshold list corresponding to a resource pool of the second RAT SL module. That is to say, in the first threshold set, the threshold list corresponding to the first resource pool meets the foregoing formula.

In another implementation, the threshold list corresponding to the first resource set may be determined based on a proportion of the threshold list corresponding to the resource pool of the first RAT SL module and a proportion of the threshold list corresponding to the resource pool of the second RAT SL module.

For example, $RSRP_{sl}^{set}=(\alpha*RSRP_{lte}^{set}+\beta*RSRP_{nr}^{set})$, and $\alpha \le 1$, $\beta \le 1$, where $RSRP_{sl}^{set}$ denotes a threshold list corresponding to the first resource set or a threshold in the threshold list, $RSRP_{lte}^{set}$ denotes a threshold list corresponding to a resource pool of the first RAT SL module, and $RSRP_{nr}^{set}$ denotes a threshold list corresponding to a resource pool of the second RAT SL module.

In some embodiments, values of $\alpha$ and $\beta$ may be different for different service types or different service priorities. For example, a higher service level or a higher service priority may correspond to smaller values of $\alpha$ and $\beta$.

Implementation 2:

The first threshold set may include one threshold corresponding to the resource pool of the first RAT SL module, and/or one threshold corresponding to the resource pool of the second RAT SL module, and/or one threshold corresponding to the first resource set.

In some embodiments, the threshold corresponding to the first resource set is determined based on the threshold corresponding to the resource pool of the first RAT SL module and the threshold corresponding to the resource pool of the second RAT SL module.

In an implementation, the threshold corresponding to the first resource set may be an average value of the threshold corresponding to the resource pool of the first RAT SL module and the threshold corresponding to the resource pool of the second RAT SL module.

For example, $RSRP_{sl}=(RSRP_{lte}+RSRP_{nr})/2$, where $RSRP_{sl}$ denotes one threshold corresponding to the first resource set, $RSRP_{lte}$ denotes one threshold corresponding to the resource pool of the first RAT SL module, and $RSRP_{nr}$ denotes one threshold corresponding to the resource pool of the second RAT SL module.

In another implementation, the threshold corresponding to the first resource set may be determined based on a proportion of one threshold corresponding to the resource pool of the first RAT SL module and a proportion of one threshold corresponding to the resource pool of the second RAT SL module.

For example, $RSRP_{sl}=(\alpha*RSRP_{lte}+\beta*RSRP_{nr})$, and $\alpha \le 1$, $\beta \le 1$, where $RSRP_{sl}$ denotes one threshold corresponding to the first resource set, $RSRP_{lte}$ denotes one threshold corresponding to the resource pool of the first RAT SL module, and $RSRP_{nr}$ denotes one threshold corresponding to the resource pool of the second RAT SL module.

In some embodiments, values of $\alpha$ and $\beta$ may be different for different service types or different service priorities. For example, a higher service level or a higher service priority may correspond to smaller values of $\alpha$ and $\beta$.

Implementation 3:

The first threshold set may include two thresholds corresponding to the resource pool of the first RAT SL module, and/or one threshold corresponding to the resource pool of the second RAT SL module, and/or one threshold corresponding to the first resource set.

One of the two thresholds corresponding to the resource pool of the first RAT SL module may be used to exclude a resource that conflicts with a resource reserved for the first RAT SL module at a time domain resource location without a second RAT SL PSFCH. The other one of the two thresholds corresponding to the resource pool of the first RAT SL module may be used to exclude a resource that conflicts with a resource reserved for the first RAT SL module at a time domain resource location that has a second RAT SL PSFCH.

For example, the first RAT and the second RAT are respectively LTE and NR, and the two thresholds corresponding to the resource pool of the first RAT SL module are $RSRP_{lte1}$ and $RSRP_{lte2}$, respectively. $RSRP_{lte1}$ may be used to exclude an NR SL single slot resource that conflicts with a resource reserved for an LTE SL in a slot without an NR SL PSFCH. $RSRP_{lte2}$ may be used to exclude an NR SL single slot resource that conflicts with a resource reserved for an LTE SL in a slot that has an NR SL PSFCH resource.

In some embodiments, it is assumed that $RSRP_{lte1}<RSRP_{lte2}$. In this case, a first RAT SL reserved resource mapped to a second RAT SL time domain resource location that has a PSFCH resource requires higher signal quality than a reserved resource mapped to a non-PSFCH time domain resource location.

Implementation 4:

It should be noted that Implementation 4 may be used in combination with any one of Implementations 1 to 3, or may be used separately, which is not limited in embodiments of the present application.

In Implementation 4, a threshold corresponding to the resource pool of the first RAT SL module may be preconfigured or configured by a network. A threshold corresponding to the resource pool of the second RAT SL module is determined based on the threshold corresponding to the resource pool of the first RAT SL module.

In some embodiments, when the threshold corresponding to the resource pool of the second RAT SL module is determined based on the threshold corresponding to the resource pool of the first RAT SL module, a part actually overlapped between a sub-channel of the second RAT and a resource reserved for the first RAT SL module may be considered.

In an implementation, $$SRP_{Virtual,rat2} = \frac{RSRP_{rat1}B_{Overlap,rat1}}{B_{rat2}},$$

where $RSRP_{Virtual,rat2}$ denotes a threshold corresponding to the resource pool of the second RAT SL module, $RSRP_{rat1}$ denotes a threshold corresponding to the resource pool of the first RAT SL module, $B_{Overlap,rat1}$ denotes a bandwidth overlapped between a first RAT and a second RAT in a bandwidth of the second RAT, and $B_{rat2}$ denotes the bandwidth of the second RAT.

In some embodiments, in a case of co-channel coexistence, for different RAT types, different waveforms and/or channel codes may be used on respective SL channels. For example, an NR PSCCH and/or an NR PSSCH may use waveforms different from those of an LTE PSCCH and/or an LTE PSSCH, respectively. In this way, a terminal device configured to detect LTE signaling (such as the LTE PSCCH) may not be able to detect similar NR signaling (such as the NR PSCCH), and vice versa.

In this case, signal quality of different RATs may need to be converted. LTE and NR are used as examples, and an LTE SL RSRP may need to be converted into an NR SL RSRP. In an implementation, the LTE SL RSRP is measured on a DMRS of the PSCCH, and the PSCCH has an improvement of 3 dB PSD compared with the PSSCH. Therefore, this may be considered when the LTE SL RSRP is converted into a similar NR measurement value.

In some embodiments, when performing resource exclusion, the second RAT SL module may use a signal quality measurement result of a first RAT PSSCH. For example, when the first RAT SL module shares first information with the second RAT SL module, the second RAT SL module may perform resource exclusion based on the signal quality measurement result of the first RAT PSSCH shared by the first RAT SL module. An example in which the first RAT and the second RAT are respectively LTE and NR is used. The first information (for example, information related to an LTE SL resource transmitted by using an LTE SL of an LTE SL module) is shared by the LTE SL module to an NR SL module. When the NR SL module determines that an NR SL candidate resource that overlaps with a resource reserved for the LTE SL of an LTE PSCCH is excluded at a physical layer, an LTE PSSCH-RSRP measurement result may be used.

In some embodiments, when the second RAT SL module determines that the NR SL candidate resource that overlaps with a resource reserved for the LTE SL of the LTE PSCCH is excluded, a conversion between a signal quality measurement value of the first RAT PSSCH and a signal quality measurement value of the second RAT PSSCH may be considered. For example, when the NR SL module determines that the NR SL candidate resource that overlaps with a resource reserved for the LTE SL of the LTE PSCCH is excluded, an LTE PSSCH RSRP measurement value with a 3 dB improvement may be used.

In some embodiments, when the second RAT SL module determines that the NR SL candidate resource that overlaps with a resource reserved for the LTE SL of the LTE PSCCH is excluded, the signal quality measurement value of the first RAT PSSCH may be used. For example, when the NR SL module determines that the NR SL candidate resource that overlaps with a resource reserved for the LTE SL of the LTE PSSCH is excluded, the LTE PSSCH-RSRP measurement result may be used.

In some embodiments, a lower layer of the terminal device may determine a subset of resources, and a higher layer may select, from the resource subset, a resource for transmission of a PSSCH/PSCCH from the terminal device.

In some embodiments, the terminal device may exclude a candidate resource that meets a specific condition, for example, an SCI indicating resource reservation information for a same SL RAT and having an RSRP measurement value that meets a threshold is received from another device.

In some embodiments, the terminal device may further exclude, from a candidate resource subset, one or more candidate resources that overlap with an SL resource reserved for transmission on different RAT SLs.

In some embodiments, same as a resource reserved for transmission on a same RAT SL, the terminal device may determine whether a specific condition is met, so as to determine whether a reserved resource used for transmission on a second RAT SL is considered as a resource reserved in a resource selection process for an SL resource.

In some embodiments, one or more SL resource pools of the terminal device may be configured by a higher layer.

The methods embodiments of the present application are described in detail above with reference to FIG. 1 to FIG. 6. The apparatus embodiments of the present application are described in detail below with reference to FIG. 7 and FIG. 8. It should be understood that the description of the method embodiments corresponds to the description of the apparatus embodiments, and therefore, for parts that are not described in detail, reference may be made to the foregoing method embodiments.

Figure 7:
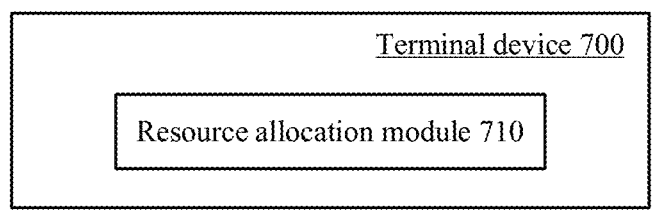
FIG. 7 is a schematic structural diagram of a terminal device according to an embodiment of the present application.

FIG. 7 is a schematic structural diagram of a terminal device according to an embodiment of the present application. A terminal device 700 shown in FIG. 7 may include a resource allocation module 710.

The resource allocation module 710 may be configured to perform resource allocation for a first resource set based on first information, where the first resource set is shared by a first RAT SL module and a second RAT SL module, and the first information is associated with a resource of the first RAT SL module.

Optionally, the first information is used to indicate sensing information and/or resource reservation information corresponding to the first RAT SL module.

Optionally, the resource allocation module 710 is disposed in the second RAT SL module, and the first information is obtained by the second RAT SL module from the first RAT SL module.

Optionally, the resource allocation module 710 is further configured to perform, based on the first information, resource exclusion for the first resource set, to obtain a second resource set, where the second resource set is used to determine a resource, in the first resource set, capable of being used by the second RAT SL module.

Optionally, the first resource set includes a first candidate resource, and the performing, based on the first information, resource exclusion for the first resource set includes: when a first condition is met, excluding the first candidate resource from the first resource set, where the first condition is associated with one or more of the following: a resource reserved for the first RAT SL module or a resource associated with an unmonitored subframe; measured signal quality of a sidelink signal; and a service priority.

Optionally, the first condition includes one or more of the following conditions: the first candidate resource or a periodic resource corresponding to the first candidate resource overlaps with the resource reserved for the first RAT SL module; the first candidate resource or the periodic resource corresponding to the first candidate resource overlaps with the resource associated with an unmonitored subframe of the first RAT SL module; signal quality, measured by the first RAT SL module, of the sidelink signal is higher than a first signal quality threshold; a priority of a service transmitted by the first RAT SL module is higher than a priority of a service transmitted by the second RAT SL module; a priority of a service transmitted by another first RAT SL terminal device is higher than a priority of a service transmitted by the second RAT SL module; and signal quality, measured by the another first RAT SL terminal device, of a sidelink signal is higher than the first signal quality threshold.

Optionally, the first signal quality threshold may be determined based on one or more of the following: the priority of the service transmitted by the first RAT SL module, and the priority of the service transmitted by the second RAT SL module.

Optionally, the first signal quality threshold is determined based on a first threshold set, and the first threshold set includes: one or more thresholds corresponding to a resource pool of the first RAT SL module; and/or one or more thresholds corresponding to a resource pool of the second RAT SL module; and/or one or more thresholds corresponding to the first resource set.

Optionally, the plurality of thresholds corresponding to the resource pool of the first RAT SL module may be determined based on one of more of the following: a type of a service transmitted by the first RAT SL module, a time domain resource location, and a resource block in the resource pool of the first RAT SL module; or the plurality of thresholds corresponding to the resource pool of the second RAT SL module are determined based on one or more of the following: a type of a service transmitted by the second RAT SL module, a time domain resource location, and a resource block in the resource pool of the second RAT SL module; or the plurality of thresholds corresponding to the first resource set are determined based on one or more of the following: a type of a service transmitted by using the first resource set, a time domain resource location, and a resource block in the first resource set.

Optionally, each threshold in the one or more thresholds corresponding to the first resource set is determined based on the one or more thresholds corresponding to the resource pool of the first RAT SL module and the one or more thresholds corresponding to the resource pool of the second RAT SL module.

Optionally, $RSRP_{sl}=(RSRP_{rat1}+RSRP_{rat2})/2$, where $RSRP_{sl}$ denotes a threshold in the one or more thresholds corresponding to the first resource set, $RSRP_{rat1}$ denotes the one or more thresholds corresponding to the resource pool of the first RAT SL module, and $RSRP_{rat2}$ denotes the one or more thresholds corresponding to the resource pool of the second RAT SL module.

Optionally, $RSRP_{sl}=\alpha*RSRP_{rat1}+\beta*RSRP_{rat2}$, where $RSRP_{sl}$ denotes a threshold in the one or more thresholds corresponding to the first resource set, $RSRP_{rat1}$ denotes the one or more thresholds corresponding to the resource pool of the first RAT SL module, $RSRP_{rat2}$ denotes the one or more thresholds corresponding to the resource pool of the second RAT SL module, and both $\alpha$ and $\beta$ are numbers greater than 0 and less than or equal to 1.

Optionally, values of $\alpha$ and $\beta$ are different for different service types or different service priorities.

Optionally, the first threshold set includes two thresholds corresponding to the resource pool of the first RAT SL module, and/or one threshold corresponding to the resource pool of the second RAT SL module, and/or one threshold corresponding to the first resource set. One of the two thresholds corresponding to the resource pool of the first RAT SL module is used to exclude a resource conflicting, at a time domain resource location that does not have a second RAT SL physical sidelink feedback channel PSFCH, with a resource reserved for the first RAT SL module, and the other of the two thresholds corresponding to the resource pool of the first RAT SL module is used to exclude a resource conflicting, at a time domain resource location that has the second RAT SL PSFCH, with the resource reserved for the first RAT SL module.

Optionally, the first threshold set is preconfigured.

Optionally, the threshold corresponding to the resource pool of the second RAT SL module is determined based on the threshold corresponding to the resource pool of the first RAT SL module.

Optionally, $$RSRP_{Virtual,rat2} = \frac{RSRP_{rat1} B_{Overlap,rat1}}{B_{rat2}},$$

where $RSRP_{Virtual,rat2}$ denotes a threshold corresponding to the resource pool of the second RAT SL module, $RSRP_{rat1}$ denotes a threshold corresponding to the resource pool of the first RAT SL module, $B_{Overlap,rat1}$ denotes a bandwidth overlapped between a first RAT and a second RAT in a bandwidth of the second RAT, and $B_{rat2}$ denotes the bandwidth of the second RAT.

Optionally, the resource pool of the first RAT SL module includes a resource that is not monitored or reserved by another first RAT SL terminal device.

Optionally, if measured signal quality associated with a resource reserved for the first RAT SL module is N times higher than a threshold corresponding to the first resource set, in the first resource set, a resource allocated by the terminal device to the first RAT SL module and a resource allocated for transmission of a PSFCH are N*M times a resource allocated to the second RAT SL module, and M is a positive integer.

Optionally, if N*M is greater than a first target value, in the first resource set, a quantity of the resource allocated by the terminal device to the first RAT SL module and the resource allocated for transmission of the PSFCH is the first target value, and the first target value is a resource use threshold corresponding to the first resource set.

Optionally, the first RAT SL module is an LTE SL module, and the second RAT SL module is an NR SL module.

In an optional embodiment, the resource allocation module 910 may be a processor 810. The terminal device 700 may further include a transceiver 830 and a memory 820, as specifically shown in FIG. 8.

Figure 8:
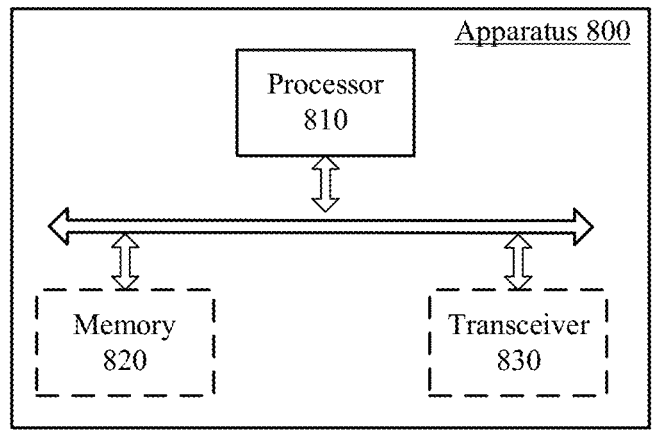
FIG. 8 is a schematic structural diagram of a communications apparatus according to an embodiment of the present application.

FIG. 8 is a schematic structural diagram of a communications apparatus according to an embodiment of the present application. The dashed lines in FIG. 8 indicate that the unit or module is optional. The apparatus 800 may be configured to implement the methods described in the foregoing method embodiments. The apparatus 800 may be a chip, a terminal device, or a network device.

The apparatus 800 may include one or more processors 810. The processor 810 may allow the apparatus 800 to implement the methods described in the foregoing method embodiments. The processor 810 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 800 may further include one or more memories 820. The memory 820 stores a program that may be executed by the processor 810 to cause the processor 810 to perform the methods described in the foregoing method embodiments. The memory 820 may be independent of the processor 810 or may be integrated into the processor 810.

The apparatus 800 may further include a transceiver 830. The processor 810 may communicate with another device or chip through the transceiver 830. For example, the processor 810 may send and receive data to and from another device or chip through the transceiver 830.

An embodiment of the present application further provides a computer-readable storage medium for storing a program. The computer-readable storage medium may be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in the embodiments of the present application, and the program causes a computer to perform the methods to be performed by the terminal or the network device in various embodiments of the present application.

An embodiment of the present application further provides a computer program. The computer program may be applied to the terminal or the network device provided in the embodiments of the present application, and the computer program causes a computer to perform the methods to be performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, "B that is corresponding to A" means that B is associated with A, and B may be determined based on A. However, it should also be understood that, determining B based on A does not mean determining B based only on A, but instead B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In the embodiments of the present application, "include" mentioned may refer to direct inclusion, or may refer to indirect inclusion. Optionally, the term "include" mentioned in the embodiments of the present application may be replaced with "indicate" or "be used to". For example, A including B may be replaced with that A indicates B, or A is used to determine B.

In the embodiments of the present application, "pre-defined" or "preconfigured" may be implemented by pre-storing corresponding codes, tables, or other forms that may be used to indicate related information in devices (for example, including a terminal device and a network device), and a specific implementation thereof is not limited in the present application. For example, pre-defined may refer to defined in the protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for communication, wherein the method comprises:
performing, by a terminal device, resource allocation for a first resource set based on first information, wherein the first resource set is shared by a first radio access technology (RAT) sidelink (SL) and a second RAT SL, and the first information is associated with a resource of the first RAT SL, wherein the performing resource allocation comprises:
performing, by the terminal device based on the first information, resource exclusion for the first resource set, to obtain a second resource set, wherein the second resource set comprises a resource capable of being used by the second RAT SL, wherein the first resource set comprises a first candidate resource, and the performing, by the terminal device based on the first information, resource exclusion for the first resource set comprises:
when a first condition is met, excluding, by the terminal device, the first candidate resource from the first resource set, wherein the first condition comprises at least one of the following conditions:
signal quality of a sidelink signal associated with the first RAT SL measured by the terminal device is higher than a first signal quality threshold; or
signal quality of a sidelink signal associated with the first RAT SL measured by another terminal device is higher than the first signal quality threshold; wherein
the first signal quality threshold is determined based on a first threshold set, wherein the first threshold set includes: one or more thresholds corresponding to a resource pool of the first RAT SL, one or more thresholds corresponding to a resource pool of the second RAT SL, and one or more thresholds corresponding to the first resource set; and wherein the first threshold set comprises: two thresholds corresponding to the resource pool of the first RAT SL and one threshold corresponding to the resource pool of the second RAT SL, wherein one of the two thresholds corresponding to the resource pool of the first RAT SL is used to exclude a resource conflicting, at a time domain resource location that does not have a second RAT SL physical sidelink feedback channel (PSFCH), with a resource reserved for the first RAT SL, and the other of the two thresholds corresponding to the resource pool of the first RAT SL is used to exclude a resource conflicting, at a time domain resource location that has the second RAT SL PSFCH, with the resource reserved for the first RAT SL.

2. The method according to claim 1, wherein the first signal quality threshold is determined further based on one or more of the following: a priority of the first RAT SL or a priority of the second RAT SL.

3. The method according to claim 1, wherein
one or more thresholds corresponding to the resource pool of the first RAT SL are determined based on one or more of the following: a type of a service transmitted by the first RAT SL, a time domain resource location, or a resource block in the resource pool of the first RAT SL; or
one or more thresholds corresponding to the resource pool of the second RAT SL are determined based on one or more of the following: a type of a service transmitted by the second RAT SL, a time domain resource location, or a resource block in the resource pool of the second RAT SL; or
one or more thresholds corresponding to the first resource set are determined based on one or more of the following: a type of a service transmitted by using the first resource set, a time domain resource location, or a resource block in the first resource set.

4. The method according to claim 1, wherein each of one or more thresholds corresponding to the first resource set is determined based on the one or more thresholds corresponding to the resource pool of the first RAT SL and the one or more thresholds corresponding to the resource pool of the second RAT SL.

5. The method according to claim 4, wherein $$RSRP_{sl} = (RSRP_{rat1} + RSRP_{rat2})/2$$

wherein $RSRP_{sl}$ denotes a threshold in the one or more thresholds corresponding to the first resource set, $RSRP_{rat1}$ denotes the one or more thresholds corresponding to the resource pool of the first RAT SL, and $RSRP_{rat2}$ denotes the one or more thresholds corresponding to the resource pool of the second RAT SL.

6. The method according to claim 4, wherein $$RSRP_{sl} = \alpha * RSRP_{rat1} + \beta * RSRP_{rat2}$$

wherein $RSRP_{sl}$ denotes a threshold in the one or more thresholds corresponding to the first resource set, $RSRP_{rat1}$ denotes the one or more thresholds corresponding to the resource pool of the first RAT SL, $RSRP_{rat2}$ denotes the one or more thresholds corresponding to the resource pool of the second RAT SL, and both $\alpha$ and ?2 are numbers greater than 0 and less than or equal to 1.

7. The method according to claim 6, wherein values of $\alpha$ and ?2 are different for different service types or different service priorities.

8. The method according to claim 1, wherein the first threshold set comprises one threshold corresponding to the first resource set.

9. The method according to claim 1, wherein the first threshold set is preconfigured.

10. The method according to claim 1, wherein a threshold corresponding to the resource pool of the second RAT SL is determined based on a threshold corresponding to the resource pool of the first RAT SL.

11. The method according to claim 10, wherein $$RSRP_{Virtual,rat2} = \frac{RSRP_{rat1} B_{Overlap,rat1}}{B_{rat2}}$$

wherein $RSRP_{virtual,rat2}$ denotes a threshold corresponding to the resource pool of the second RAT SL, $RSRP_{rat1}$ denotes a threshold corresponding to the resource pool of the first RAT SL, $B_{Overlap,rat1}$ denotes a bandwidth overlapped between a first RAT and a second RAT in a bandwidth of the second RAT, and $B_{rat2}$ denotes the bandwidth of the second RAT.

12. The method according to claim 1, wherein a resource pool of the first RAT SL comprises a resource that is not monitored or a resource reserved for another first RAT SL terminal device.

13. The method according to claim 1, wherein measured signal quality associated with a resource reserved for the first RAT SL is N times a threshold corresponding to the first resource set, in the first resource set, a resource allocated by the terminal device to the first RAT SL and a resource allocated for transmission of a PSFCH are N*M times a resource allocated to the second RAT SL, and M is a positive integer, and N is a positive number.

14. The method according to claim 13, wherein N*M is greater than a first target value, in the first resource set, a quantity of the resource allocated by the terminal device to the first RAT SL in the first resource set and the resource allocated for transmission of the PSFCH is the first target value, and the first target value is a resource use threshold corresponding to the first resource set.

15. The method according to claim 1, wherein the first information comprises at least one of:
   information of a reserved resource of the first RAT SL;
   information of a reserved resource determined based on sidelink control information (SCI) decoding;
   sub-channel configuration information;
   sensing information;
   a candidate resource set;
   information of a logical subframe;
   priority information; or
   information of a transmission resource.

16. The method according to claim 1, wherein the first RAT SL is a long term evolution (LTE) SL, and the second RAT SL is a new radio (NR) SL.

17. A communication apparatus, comprising:
   at least one processor;
   one or more non-transitory computer-readable storage media coupled to the at least one processor and storing programming instructions for execution by the at least one processor, wherein the programming instructions, when executed, cause the apparatus to perform operations comprising:
   performing resource allocation for a first resource set based on first information, wherein the first resource set is shared by a first radio access technology (RAT) sidelink (SL) and a second RAT SL, and the first information is associated with a resource of the first RAT SL, wherein the performing resource allocation comprises:
      performing, based on the first information, resource exclusion for the first resource set, to obtain a second resource set, wherein the second resource set comprises a resource capable of being used by the second RAT SL, wherein the first resource set comprises a first candidate resource, and the performing, based on the first information, resource exclusion for the first resource set comprises
      when a first condition is met, excluding, the first candidate resource from the first resource set, wherein the first condition comprises at least one of the following conditions:
      signal quality of a sidelink signal associated with the first RAT SL measured by the communication apparatus is higher than a first signal quality threshold; or
      signal quality of a sidelink signal associated with the first RAT SL measured by another communication apparatus is higher than the first signal quality threshold; wherein
   the first signal quality threshold is determined based on a first threshold set, wherein the first threshold set includes: one or more thresholds corresponding to a resource pool of the first RAT SL, one or more thresholds corresponding to a resource pool of the second RAT SL, and one or more thresholds corresponding to the first resource set, and wherein the first threshold set comprises: two thresholds corresponding to the resource pool of the first RAT SL and one threshold corresponding to the resource pool of the second RAT SL, wherein one of the two thresholds corresponding to the resource pool of the first RAT SL is used to exclude a resource conflicting, at a time domain resource location that does not have a second RAT SL physical sidelink feedback channel (PSFCH), with a resource reserved for the first RAT SL, and the other of the two thresholds corresponding to the resource pool of the first RAT SL is used to exclude a resource conflicting, at a time domain resource location that has the second RAT SL PSFCH, with the resource reserved for the first RAT SL.

18. One or more non-transitory computer-readable media storing computer instructions, that when executed by one or more processors, cause a computing device to perform operations comprising:
   performing resource allocation for a first resource set based on first information, wherein the first resource set is shared by a first radio access technology (RAT) sidelink (SL) and a second RAT SL, and the first information is associated with a resource of the first RAT SL, wherein the performing resource allocation comprises:
      performing, based on the first information, resource exclusion for the first resource set, to obtain a second resource set, wherein the second resource set comprises a resource capable of being used by the second RAT SL, wherein the first resource set comprises a first candidate resource, and the performing, based on the first information, resource exclusion for the first resource set comprises
      when a first condition is met, excluding, the first candidate resource from the first resource set, wherein the first condition comprises at least one of the following conditions:
      signal quality of a sidelink signal associated with the first RAT SL measured by a terminal device is higher than a first signal quality threshold; or
      signal quality of a sidelink signal associated with the first RAT SL measured by another terminal device is higher than the first signal quality threshold; wherein
   the first signal quality threshold is determined based on a first threshold set, wherein the first threshold set includes: one or more thresholds corresponding to a resource pool of the first RAT SL, one or more thresholds corresponding to a resource pool of the second RAT SL, and one or more thresholds corresponding to the first resource set, and wherein the first threshold set comprises: two thresholds corresponding to the resource pool of the first RAT SL and one threshold corresponding to the resource pool of the second RAT SL, wherein one of the two thresholds corresponding to the resource pool of the first RAT SL is used to exclude a resource conflicting, at a time domain resource location that does not have a second RAT SL physical sidelink feedback channel (PSFCH), with a resource reserved for the first RAT SL, and the other of the two thresholds corresponding to the resource pool of the first RAT SL is used to exclude a resource conflicting, at a time domain resource location that has the second RAT SL PSFCH, with the resource reserved for the first RAT SL.

* * * * *